(12) United States Patent
Jeon et al.

(10) Patent No.: US 11,006,145 B2
(45) Date of Patent: May 11, 2021

(54) INTRA PREDICTION METHOD AND APPARATUS USING THE METHOD

(71) Applicant: LG Electronics Inc., Seoul (KR)

(72) Inventors: Yong Joon Jeon, Seoul (KR); Seung Wook Park, Seoul (KR); Jae Hyun Lim, Seoul (KR); Jung Sun Kim, Seoul (KR); Joon Young Park, Seoul (KR); Young Hee Choi, Seoul (KR); Jae Won Sung, Seoul (KR); Byeong Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/814,649

(22) Filed: Mar. 10, 2020

(65) Prior Publication Data

US 2020/0228829 A1 Jul. 16, 2020

Related U.S. Application Data

(63) Continuation of application No. 16/194,898, filed on Nov. 19, 2018, now Pat. No. 10,609,410, which is a
(Continued)

(51) Int. Cl.
*H04N 19/105* (2014.01)
*H04N 19/159* (2014.01)
(Continued)

(52) U.S. Cl.
CPC ......... *H04N 19/577* (2014.11); *H04N 19/105* (2014.11); *H04N 19/11* (2014.11);
(Continued)

(58) Field of Classification Search
CPC .................................................. H04N 19/577
See application file for complete search history.

(56) References Cited

U.S. PATENT DOCUMENTS

| 6,466,620 B1 | 10/2002 | Lee |
| 7,649,943 B2 * | 1/2010 | Speed .................. H04N 19/126 375/240.16 |

(Continued)

FOREIGN PATENT DOCUMENTS

| CN | 101682781 | 3/2010 |
| JP | 2007259306 | 10/2007 |

(Continued)

OTHER PUBLICATIONS

Davies et al., "Suggestion for a Test Model," Joint Collaborative Team on Video Coding (JCT-VG) of ITU-T SG16 WP3 and ISO/IEC JTC1/SC29/WG11, 1st Meeting: Dresden, DE, Apr. 15-23, 2010, 30 pages.

(Continued)

*Primary Examiner* — Irfan Habib
(74) *Attorney, Agent, or Firm* — Fish & Richardson P.C.

(57) ABSTRACT

An intra prediction method and a device using the intra prediction method are provided. The intra prediction method using a DC mode includes setting a bottom-right pixel to a DC-predicted value, interpolating the bottom-right pixel and an n-th top reference pixel to derive predicted values of an n-th column and interpolating the bottom-right pixel and an n-th left reference pixel to derive predicted values of an n-row, and performing bidirectional linear interpolation to derive predicted values of pixels included in a prediction unit other than the n-th row and the n-th column.

16 Claims, 26 Drawing Sheets

Related U.S. Application Data continuation of application No. 15/859,132, filed on Dec. 29, 2017, now Pat. No. 10,136,158, which is a continuation of application No. 15/622,771, filed on Jun. 14, 2017, now Pat. No. 9,860,557, which is a continuation of application No. 13/997,385, filed as application No. PCT/KR2011/009954 on Dec. 21, 2011, now Pat. No. 9,693,054.

(60) Provisional application No. 61/476,311, filed on Apr. 17, 2011, provisional application No. 61/475,636, filed on Apr. 14, 2011, provisional application No. 61/471,185, filed on Apr. 3, 2011, provisional application No. 61/426,480, filed on Dec. 22, 2010.

(51) Int. Cl.
| | | |
|---|---|---|
| *H04N 19/70* | (2014.01) | |
| *H04N 19/577* | (2014.01) | |
| *H04N 19/11* | (2014.01) | |
| *H04N 19/593* | (2014.01) | |
| *H04N 19/182* | (2014.01) | |
| *H04N 19/80* | (2014.01) | |

(52) U.S. Cl.
CPC ......... *H04N 19/159* (2014.11); *H04N 19/182* (2014.11); *H04N 19/593* (2014.11); *H04N 19/70* (2014.11); *H04N 19/80* (2014.11)

(56) References Cited

U.S. PATENT DOCUMENTS

| | | | | |
|---|---|---|---|---|
| 8,085,845 | B2* | 12/2011 | Tourapis | H04N 19/86 |
| | | | | 375/240.16 |
| 9,066,104 | B2* | 6/2015 | Wang | H04N 19/196 |
| 9,143,781 | B2* | 9/2015 | Coban | H04N 19/70 |
| 9,237,345 | B2* | 1/2016 | Kang | H04N 19/597 |
| 9,288,500 | B2* | 3/2016 | Budagavi | H04N 19/176 |
| 9,313,494 | B2* | 4/2016 | Zheng | H04N 19/593 |
| 9,357,212 | B2* | 5/2016 | Zhang | H04N 19/105 |
| 9,426,463 | B2* | 8/2016 | Seregin | H04N 19/52 |
| 9,432,693 | B2* | 8/2016 | Ugur | H04N 19/105 |
| 9,451,277 | B2* | 9/2016 | Wang | H04N 19/52 |
| 9,491,460 | B2* | 11/2016 | Seregin | H04N 19/109 |
| 9,521,426 | B2* | 12/2016 | Park | H04N 19/51 |
| 9,554,150 | B2* | 1/2017 | Zhang | H04N 19/70 |
| 9,554,152 | B2* | 1/2017 | Hsieh | H04N 19/124 |
| 9,560,358 | B2* | 1/2017 | Chen | H04N 19/157 |
| 9,571,834 | B2* | 2/2017 | Hendry | H04N 19/44 |
| 9,635,356 | B2* | 4/2017 | Li | H04N 19/51 |
| 9,693,054 | B2* | 6/2017 | Jeon | H04N 19/593 |
| 9,693,060 | B2* | 6/2017 | Seregin | H04N 19/577 |
| 9,800,857 | B2* | 10/2017 | Zhang | H04N 19/80 |
| 9,883,203 | B2* | 1/2018 | Chien | H04N 19/139 |
| 9,967,592 | B2* | 5/2018 | Zhang | H04N 19/577 |
| 2004/0008771 | A1* | 1/2004 | Karczewicz | H04N 19/196 |
| | | | | 375/240.03 |
| 2004/0136461 | A1* | 7/2004 | Kondo | H04N 19/573 |
| | | | | 375/240.16 |
| 2008/0056618 | A1* | 3/2008 | Yoshino | H04N 9/04515 |
| | | | | 382/300 |
| 2009/0135976 | A1* | 5/2009 | Ramakrishnan | G10L 19/005 |
| | | | | 375/371 |
| 2009/0232207 | A1* | 9/2009 | Chen | H04N 19/61 |
| | | | | 375/240.12 |
| 2011/0243219 | A1* | 10/2011 | Hong | H04N 19/184 |
| | | | | 375/240.02 |
| 2011/0243244 | A1* | 10/2011 | Min | H04N 19/60 |
| | | | | 375/240.18 |
| 2011/0280304 | A1* | 11/2011 | Jeon | H04N 19/103 |
| | | | | 375/240.12 |
| 2011/0293001 | A1* | 12/2011 | Lim | G06K 9/36 |
| | | | | 375/240.12 |
| 2012/0002716 | A1* | 1/2012 | Antonellis | H04N 19/14 |
| | | | | 375/240.01 |
| 2012/0134425 | A1* | 5/2012 | Kossentini | H04N 19/186 |
| | | | | 375/240.25 |
| 2012/0195378 | A1* | 8/2012 | Zheng | H04N 19/136 |
| | | | | 375/240.12 |
| 2012/0328024 | A1* | 12/2012 | Kondo | H04N 19/127 |
| | | | | 375/240.16 |
| 2013/0272405 | A1* | 10/2013 | Jeon | H04N 19/105 |
| | | | | 375/240.15 |
| 2013/0329797 | A1* | 12/2013 | Sugio | H04N 19/52 |
| | | | | 375/240.15 |
| 2014/0003521 | A1* | 1/2014 | Lee | H04N 19/52 |
| | | | | 375/240.15 |
| 2015/0023405 | A1* | 1/2015 | Joshi | H04N 19/593 |
| | | | | 375/240.02 |
| 2015/0043641 | A1* | 2/2015 | Gamei | H04N 19/44 |
| | | | | 375/240.12 |
| 2015/0172701 | A1* | 6/2015 | Kondo | H04N 19/30 |
| | | | | 375/240.16 |
| 2015/0195566 | A1* | 7/2015 | Hinz | H04N 19/503 |
| | | | | 375/240.13 |
| 2015/0281728 | A1* | 10/2015 | Karczewicz | H04N 19/27 |
| | | | | 375/240.16 |

FOREIGN PATENT DOCUMENTS

| | | |
|---|---|---|
| KR | 20060095821 | 9/2006 |
| KR | 20070001621 | 1/2007 |
| KR | 20090097688 | 9/2009 |
| KR | 20090116655 | 11/2009 |
| KR | 20100000011 | 1/2010 |
| KR | 20000015558 | 3/2015 |
| WO | WO2010002214 | 3/2010 |

OTHER PUBLICATIONS

Extended European Search Report issued in European Application No. 11850923.1 dated Nov. 28, 2016, 12 pages.

International Search Report, dated Jun. 29, 2012 for Application No. PCT/KR2011/009954, with English Translation, 4 pages.

Kanumnri et al., "Enhancements to Intra Coding," Joint Collaborative Team on Video Coding (JCT-VC) of ITU-T SG 16 WP3 and ISO/IEC JTC1/SC29/WG11, 4th Meeting: Daegn, KR, Jan. 20-28, 2011, 7 pages.

Korean Notice of Allowance dated Oct. 8, 2015 for Korean Application No. 10-2013-7019270, 6 pages.

Lainema et al., "Intra Picture Coding with Planar Representations,"28th Picture Coding Symposium, PCS2010, Dec. 8-10, 2010, Nagoya, Japan, pp. 198-201.

Nan et al., "Spatial Prediction Based Intra-Coding," 2004 IEEE International Conference on Multimedia and Expo ICME), 2004, pp. 97-100.

Office Action dated Jun. 19, 2015 for corresponding Korean Patent Application No. 10-2013-7019270, 4 pages.

Office Action issued in Chinese Application No. 201180062546.4 dated Nov. 2, 2015, 7 pages.

Song et al., "A Modification of DC and AC Prediction of Intra VOP ," International Organization for Standardization, ISO/IEC JTC 1 /SC29/WG 11, Oct. 1997, 5 pages.

Ugur et al., "Description of video coding technology proposal by Tandberg, Nokia, Ericsson," Joint Collaborative Team on Video Coding (JCT-VG) of TU-T SG16 WP3 and ISO/IEC JTC1/SC29/WG11, 1st Meeting: Dresden, DE, Apr. 15-23, 2010, 33 pages.

* cited by examiner

FIG. 4
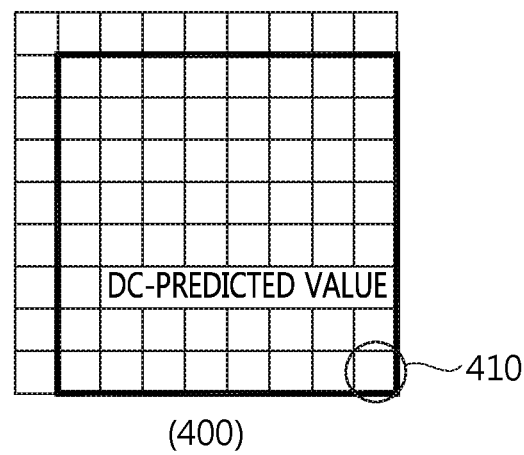
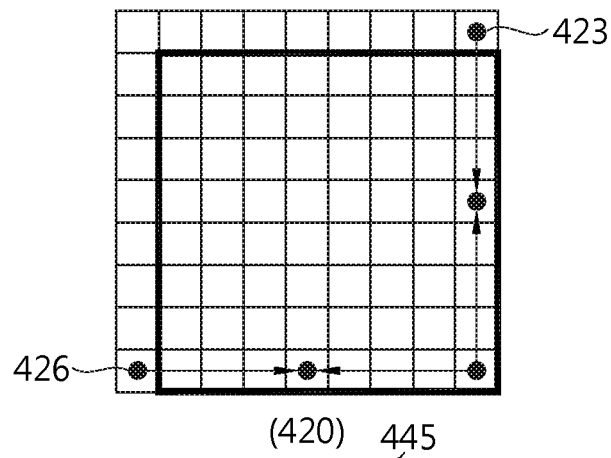
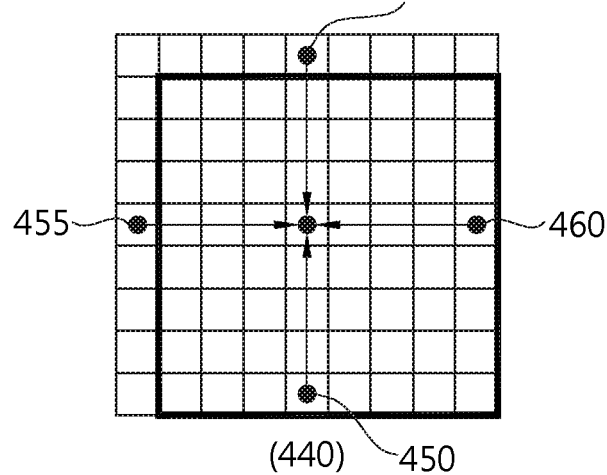

FIG. 8
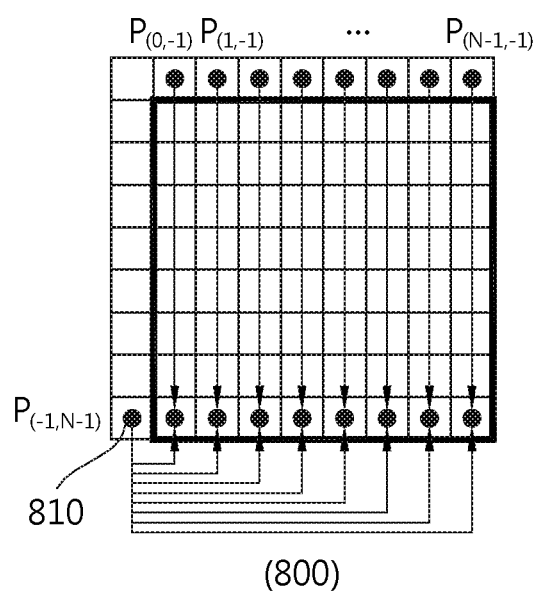
(800)
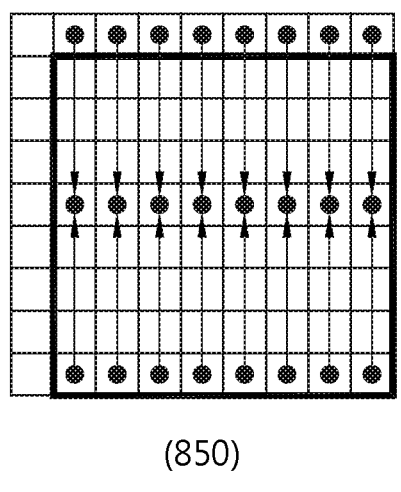
(850)

FIG. 9
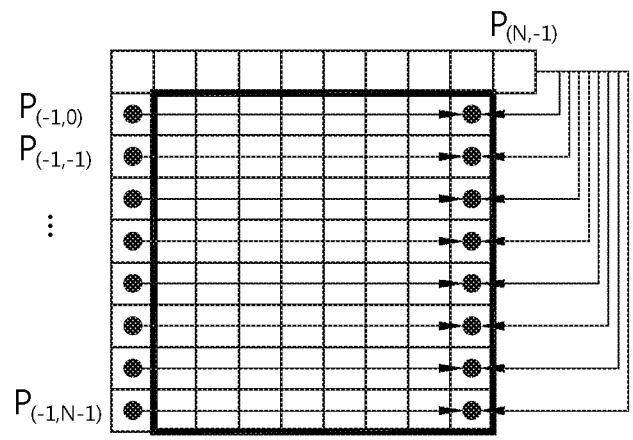
(900)
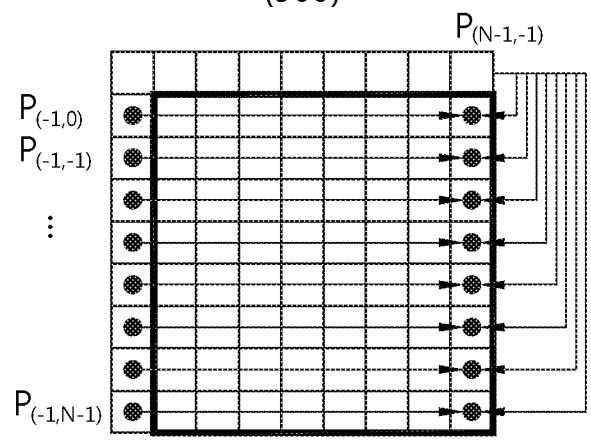
(925)
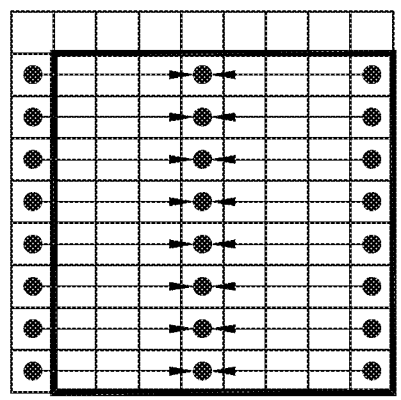
(950)

FIG. 21
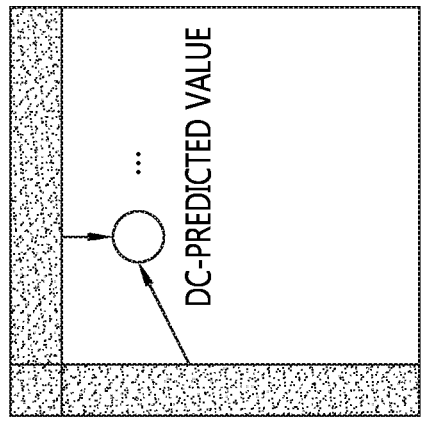
(2140)
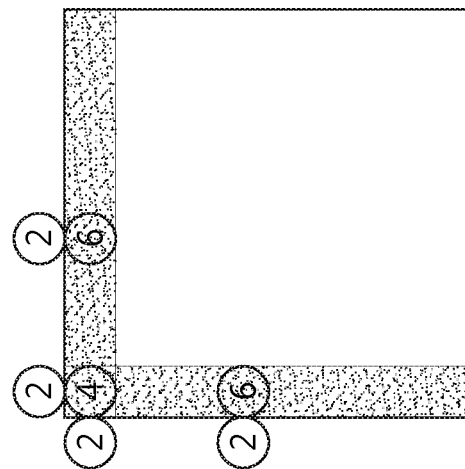
(2120)
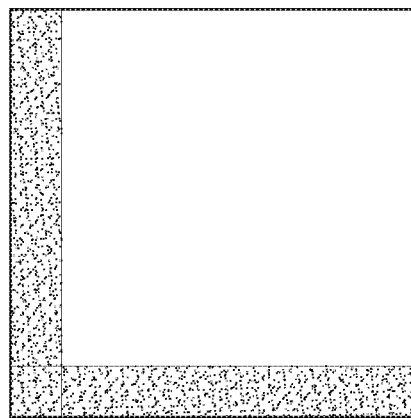
(2100)

FIG. 22
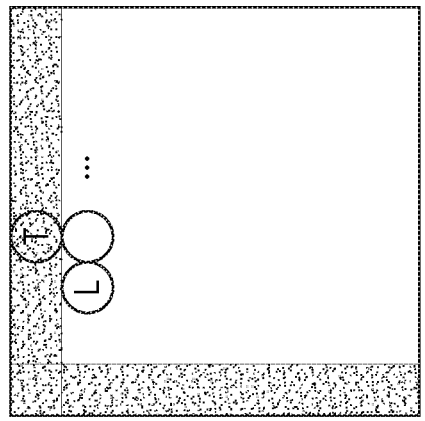
(2240)
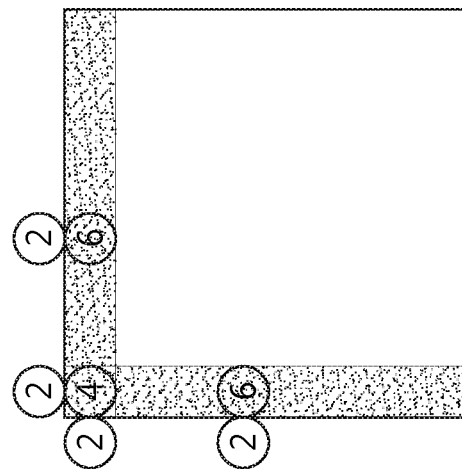
(2220)
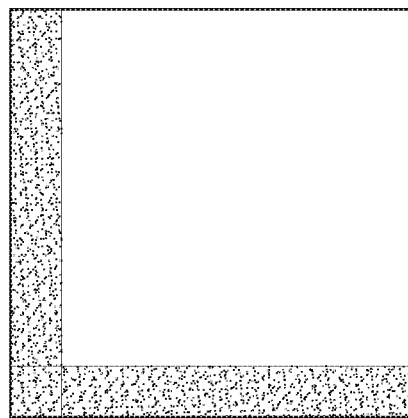
(2200)

FIG. 23
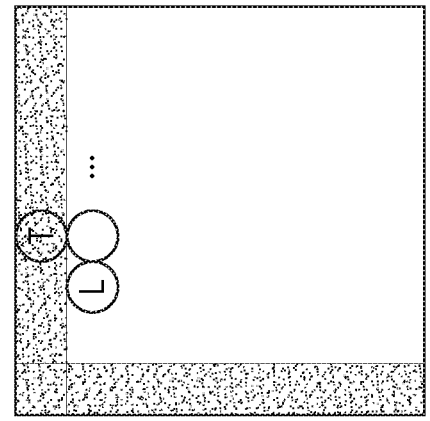
(2340)
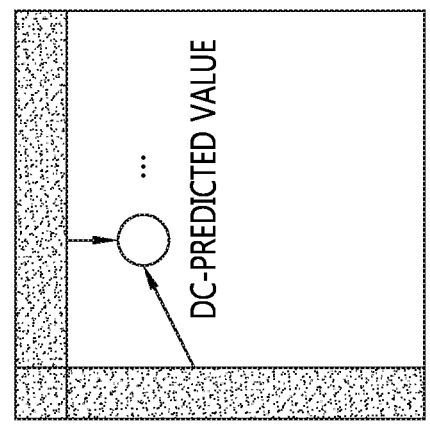
(2320)
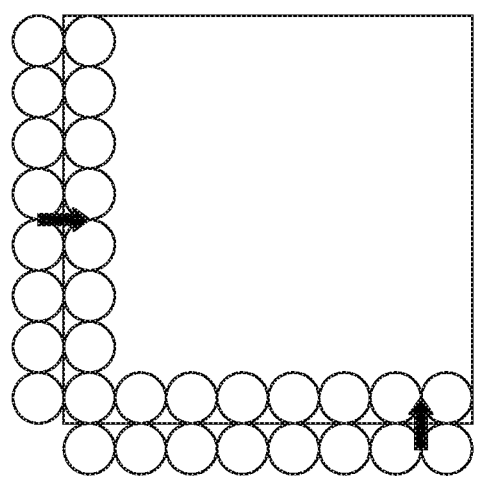
(2300)

FIG. 24

|  | P(-1,-1) | P(0,-1) | P(1,-1) | ... | P(W-1,-1) |
|---|---|---|---|---|---|
|  | P(-1,0) | P(0,0) | P(1,0) | ... | P(W-1,0) |
|  | P(-1,1) | P(0,1) |  |  |  |
|  | ⋮ | ⋮ |  |  |  |
|  | P(-1,H-1) | P(0,H-1) | ... |  | P(W-1,H-1) |

INTRA PREDICTION METHOD AND APPARATUS USING THE METHOD

CROSS-REFERENCE TO RELATED APPLICATIONS

This application is a continuation of U.S. application Ser. No. 16/194,898, filed on Nov. 19, 2018, which is a continuation of U.S. application Ser. No. 15/859,132, filed Dec. 29, 2017, now U.S. Pat. No. 10,136,158, which is a continuation of U.S. application Ser. No. 15/622,771, filed Jun. 14, 2017, now U.S. Pat. No. 9,860,557, which is a continuation of U.S. application Ser. No. 13/997,385, filed Jun. 24, 2013, now U.S. Pat. No. 9,693,054, which is a U.S. National Phase Application under 35 U.S.C. § 371 of International Application No. PCT/KR2011/009954, filed on Dec. 21, 2011, which claims the benefit of U.S. Provisional Application No. 61/426,480, filed on Dec. 22, 2010, U.S. Provisional Application No. 61/471,185, filed on Apr. 3, 2011, U.S. Provisional Application No. 61/475,636, filed on Apr. 14, 2011, and U.S. Provisional Application No. 61/476,311, filed on Apr. 17, 2011, all of which are incorporated by reference.

TECHNICAL FIELD

The present invention relates to an intra method and a device using the intra prediction method, and more particularly, to an encoding method and an encoding device.

BACKGROUND ART

Recently, demands for a high-resolution and high-quality image such as an HD (High Definition) image and an UHD (Ultra High Definition) image have increased in various fields of applications. As image data has higher resolution and higher quality, an amount of data more increases relative to existing image data. Accordingly, when image data is transferred using media such as existing wired and wireless broad band lines or is stored in existing storage media, the transfer cost and the storage cost increases. In order to solve these problems occurring with an increase in resolution and quality of image data, high-efficiency image compressing techniques can be utilized.

The image compressing techniques include various techniques such as an inter prediction technique of predicting pixel values included in a current picture from previous or subsequent pictures of the current picture, an intra prediction technique of predicting pixel values included in a current picture using pixel information in the current picture, and an entropy encoding technique of assigning a short code to a value with a high appearance frequency and assigning a long code to a value with a low appearance frequency. Image data can be effectively compressed and transferred or stored using such image compressing techniques.

SUMMARY OF INVENTION

Technical Problem

An object of the invention is to provide an intra prediction method which can enhance image encoding and decoding efficiency.

Another object of the invention is to provide a device that performs an intra prediction method which can enhance image encoding and decoding efficiency.

Technical Solution

According to an aspect of the invention, there is provided an intra prediction method using a DC mode, including: setting a bottom-right pixel to a DC-predicted value; interpolating the bottom-right pixel and an n-th top reference pixel to derive predicted values of an n-th column and interpolating the bottom-right pixel and an n-th left reference pixel to derive predicted values of an n-row; and performing bidirectional linear interpolation to derive predicted values of pixels included in a prediction unit other than the n-th row and the n-th column.

According to another aspect of the invention, there is provided an intra prediction method using a DC mode, including: setting a bottom-right pixel using an average of a top-left reference pixel, an n-th top reference pixel, and an n-th left reference pixel; interpolating the bottom-right pixel and an n-th top reference pixel to derive predicted values of an n-th column and interpolating the bottom-right pixel and an n-th left reference pixel to derive predicted values of an n-row; and performing bidirectional linear interpolation to derive predicted values of pixels included in a prediction unit other than the n-th row and the n-th column.

According to still another aspect of the invention, there is provided an intra prediction method using a DC mode, including: setting a bottom-right pixel to a DC-predicted value; interpolating the bottom-right pixel and an n-th top reference pixel to derive predicted values of an n-th column and interpolating the bottom-right pixel and an n-th left reference pixel to derive predicted values of an n-row; performing diagonal interpolation on the basis of top reference pixels, left reference pixels, and the predicted values of the n-th column and the n-th row to derive first predicted values of pixels included in a prediction unit other than the n-th row and the n-th column; and performing bidirectional linear interpolation on pixels located on the top, bottom, left, and right of the pixels included in the prediction unit other than the n-th row and the n-th column to derive second predicted values of pixels.

According to still another aspect of the invention, there is provided an intra prediction method using a DC mode, including: setting a bottom-right pixel using an average of a top-left reference pixel, an n-th top reference pixel, and an n-th left reference pixel; interpolating the bottom-right pixel and an n-th top reference pixel to derive predicted values of an n-th column and interpolating the bottom-right pixel and an n-th left reference pixel to derive predicted values of an n-row; performing diagonal interpolation on the basis of top reference pixels, left reference pixels, and the predicted values of the n-th column and the n-th row to derive first predicted values of pixels included in a prediction unit other than the n-th row and the n-th column; and performing bidirectional linear interpolation on pixels located on the top, bottom, left, and right of the pixels included in the prediction unit other than the n-th row and the n-th column to derive second predicted values of pixels.

According to still another aspect of the invention, there is provided an intra prediction method using a vertical intra prediction mode, including: generating predicted values of pixels included in an n-th row using average values of top reference pixels and an n-th left reference pixel; and interpolating the pixels included in the n-th row and the top reference pixels to derive predicted values of the pixels other than the n-th row in a prediction unit.

According to still another aspect of the invention, there is provided an intra prediction method using a horizontal intra prediction mode, including: calculating average values of left reference pixel values and an) n+1)-th top reference pixel value to generate predicted values of pixels included in an n-th column; and interpolating the pixels included in the n-th column and the left reference pixels to derive predicted values of the pixels other than the n-th column in a prediction unit.

According to still another aspect of the invention, there is provided an intra prediction method using a planar mode, including: deriving a predicted value of a bottom-right pixel; using an interpolated value of the predicted value of the bottom-right pixel and an n-th left reference pixel as a predicted value of pixels included in an n-th row and using an interpolated value of the predicted value of the bottom-right pixel and an n-th top reference pixel as a predicted value of pixels included in an n-th column; and performing bidirectional interpolation on top reference pixels included in the same column in the vertical direction as a prediction target pixel and the pixels of the n-th row and left reference pixels included in the same row in the horizontal direction as the prediction target pixel and the pixels of the n-th column to derive predicted values of pixels other than the n-th row and the n-th column in a prediction unit. The deriving of the predicted value of the bottom-right pixel may include calculating an average value of the n-th left reference pixel and the n-th top reference pixel as the predicted value of the bottom-right pixel. The deriving of the predicted value of the bottom-right pixel may include calculating an average value of the 2n-th top reference pixel and the 2n-th left reference pixel as the predicted value of the bottom-right pixel. The deriving of the predicted value of the bottom-right pixel may include: calculating a top average pixel which is an average value of the n-th top reference pixel and the 2n-th top reference pixel and a left average pixel which is an average value of the n-th left reference pixel and the 2n-th left reference pixel; and calculating an average value of the top average pixel and the left average pixel as the predicted value of the bottom-right pixel. The deriving of the predicted value of the bottom-right pixel may include deriving the predicted value of the bottom-right pixel using an average value of a top middle pixel located in the middle between the n-th top reference pixel and the 2n-th top reference pixel and a left middle pixel located in the middle between the n-th left reference pixel and the 2n-th left reference pixel.

According to still another aspect of the invention, there is provided an intra prediction method using a planar mode, including: deriving a predicted value of a bottom-right pixel; using values of from an (n+1)-th left reference pixel to an 2n-th left reference pixel as predicted values of pixels included in an n-th row and using values of from an (n+1)-th top reference pixel to an 2n-th top reference pixel as predicted values of pixels included in an n-th column; and performing bidirectional interpolation on top reference pixels included in the same column in the vertical direction as a prediction target pixel and the pixels of the n-th row and left reference pixels included in the same row in the horizontal direction as the prediction target pixel and the pixels of the n-th column to derive predicted values of pixels other than the n-th row and the n-th column in a prediction unit.

According to still another aspect of the invention, there is provided an intra prediction method using a planar mode, including: deriving a predicted value of a bottom-right pixel; performing bidirectional interpolation on values of from an (n+1)-th left reference pixel to an 2n-th left reference pixel and values of from an (n+1)-th top reference pixel to an 2n-th top reference pixel and using the interpolated value as predicted values of pixels included in an n-th row and an n-th column; and performing bidirectional interpolation on top reference pixels included in the same column in the vertical direction as a prediction target pixel and the pixels of the n-th row and left reference pixels included in the same row in the horizontal direction as the prediction target pixel and the pixels of the n-th column to derive predicted values of pixels other than the n-th row and the n-th column in a prediction unit.

According to still another aspect of the invention, there is provided an intra prediction method using a planar mode, including: deriving a left reference pixel value located in the same row in the horizontal direction, a 2n-th top reference pixel value, a top reference pixel value located in the same column in the vertical direction, and an 2n-left reference pixel value; and performing bidirectional interpolation on the left reference pixel value, the 2n-th top reference pixel value, the top reference pixel value, and the 2n-th left reference pixel value to derive predicted values of pixels included in a prediction unit.

According to still another aspect of the invention, there is provided an intra prediction method using a planar mode, including: performing horizontal interpolation using a left reference pixel value located in the same row in the horizontal direction and a 2n-th top reference pixel value; performing vertical interpolation using a top reference pixel value located in the same column in the vertical direction, and an 2n-left reference pixel value; and deriving predicted values of pixels included in a prediction unit by adding values obtained by multiplying a predetermined weight value by values obtained through the horizontal interpolation and the vertical interpolation.

Advantageous Effects

As described above, by employing the intra prediction method and the device using the method according to the aspects of the invention, it is possible to generate a prediction block having values close to the values of an original block at the time of performing the intra prediction method, thereby enhancing the encoding and decoding efficiency.

DESCRIPTION OF DRAWINGS

FIG. 4 is a conceptual diagram illustrating an intra prediction method using an advanced DC mode according to the embodiment of the invention.

FIG. 8 is a conceptual diagram illustrating a vertical intra prediction method according to an embodiment of the invention.

FIG. 9 is a conceptual diagram illustrating a horizontal intra prediction method according to an embodiment of the invention.

FIG. 21 is a conceptual diagram illustrating a prediction method using an advanced DC mode according to an embodiment of the invention.

FIG. 22 is a conceptual diagram illustrating a prediction method using an advanced DC mode according to an embodiment of the invention.

FIG. 23 is a conceptual diagram illustrating a prediction method using an advanced DC mode according to an embodiment of the invention.

FIG. 24 is a conceptual diagram illustrating a prediction method using an advanced DC mode according to an embodiment of the invention.

MODE FOR INVENTION

Figure 1:
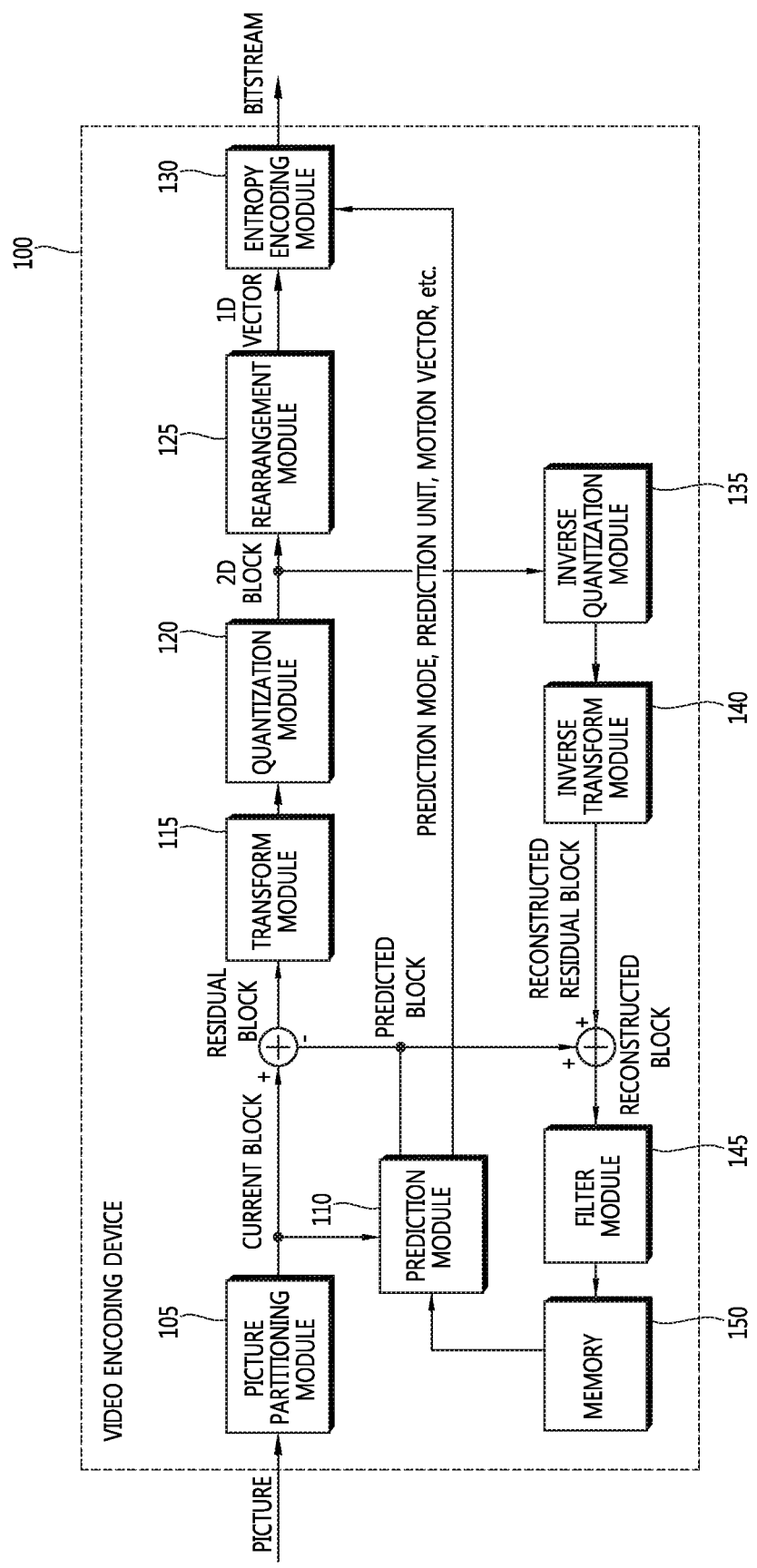
FIG. 1 is a block diagram illustrating an image encoding device according to an embodiment of the invention.

The present invention can be variously modified in various forms, and specific embodiments thereof will be described and shown in the drawings. However, the embodiments are not intended for limiting the invention, but it should be understood that the invention includes all the modifications, equivalents, and replacements belonging to the spirit and technical scope of the invention. In description with reference to the drawings, like constituents are referenced by like reference numerals.

Terms such as "first" and "second" can be used to describe various elements, but the elements are not limited to the terms. The terms are used only to distinguish one element from another element. For example, without departing from the scope of the invention, a first element may be named a second element and the second element may be named the first element similarly. The term, "and/or", includes a combination of plural elements or any one of the plural elements.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

The terms used in the following description are used to merely describe specific embodiments, but are not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Hereinafter, exemplary embodiments of the invention will be described in detail with reference to the accompanying drawings. Like constituents in the drawings will be referenced by like reference numerals and will not be repeatedly described.

FIG. 1 is a block diagram illustrating an image encoding device according to an embodiment of the invention.

Referring to FIG. 1, an image encoding device 100 includes a picture dividing module 105, a prediction module 110, a transform module 115, a quantization module 120, a rearrangement module 125, an entropy encoding module 130, an inverse quantization module 135, an inverse transform module 140, a filter module 145, and a memory 150.

The constituent modules shown in FIG. 1 are independently shown to represent different distinctive functions in the image encoding device. Each constituent module is not constructed by an independent hardware module or software unit. That is, the constituent modules are independently arranged and at least two constituent modules may be combined into a single constituent module or a single constituent module may be divided into plural constituent modules to perform functions. Embodiments in which the constituent modules are combined and embodiments in which the constituent modules are separated belong to the scope of the invention without departing from the concept of the invention.

Some constituents are not essential to the substantial functions in the invention and may be optional constituents for merely improving performance. The invention can be embodied to include only constituents essential to embodiment of the invention, except for the constituents used to merely improve performance. The structure including only the essential constituents except for the optical constituents used to merely improve performance belongs to the scope of the invention.

The picture dividing module 105 can divide an input picture into at least one process unit. Here, the process unit may be a prediction unit (PU), a transform unit (TU), or a coding unit (CU). The picture dividing module 105 can divide a picture into combinations of plural coding units, prediction units, and transform units and can select a combination of coding units, prediction units, and transform units on the basis of a predetermined criterion (for example, a cost function) to encode the picture.

For example, a picture can be divided into plural coding units. A recursive tree structure such as a quad tree structure can be used to divide a picture into coding units. A coding unit which is divided into different coding units with a picture or a coding unit of the largest size as a root can be divided with child nodes corresponding to the number of divided coding units. A coding unit which cannot be divided any more in accordance with a predetermined limitation is a leaf node. That is, when it is assumed that a coding unit can be divided in only a square shape, a single coding unit can be divided into four different coding units.

In the embodiments of the invention, a coding unit can be used to have a meaning of a unit to be decoded as well as a unit to be encoded.

A prediction unit can be divided in at least one square or rectangular shape with the same size in a coding unit, or can be divided in shapes such that the shape of one prediction unit out of the divided prediction units in a coding unit is different from the shape of another prediction unit.

When a coding unit, which is used to generate a prediction unit to be subjected to intra prediction, is not a minimum coding unit, the coding unit can be subjected to intra prediction without being divided into plural prediction units (N×N).

The prediction module 110 includes an inter prediction module that performs inter prediction and an intra prediction module that performs intra prediction. The prediction module can determine which of inter prediction or intra prediction should be performed on a prediction unit, and can determine specific information (for example, intra prediction mode, motion vector, and reference picture) of the determined prediction method. At this time, the process unit on which the prediction is performed may be different from the process unit for which the prediction method and the specific information are determined. For example, the prediction method and the prediction mode may be determined for each prediction unit and the prediction may be performed for each transform unit. Residual values (residual block) between the generated predicted block and the original block are input to the transform module 115. The prediction mode information, the motion vector information, and the like used for the prediction are encoded along with the residual values by the entropy encoding module 130 and are transmitted to the decoding device. When a specific encoding mode is used, the original block may be encoded and transmitted to the decoding device without generating a predicted block through the use of the prediction module 110.

The inter prediction module can predict a prediction unit on the basis of information of at least one picture of a previous picture and a subsequent picture of a current picture. The inter prediction module includes a reference picture interpolation module, a motion prediction module, and a motion compensation module.

The reference picture interpolation module is supplied with reference picture information from the memory 150 and generates pixel information less than an integer pixel from the reference picture. In case of luma pixels, a DCT-based 8-tap interpolation filter having different filter coefficients can be used to generate the pixel information less than an integer pixel in the unit of ¼ pixel. In case of chroma pixels, a DCT-based 4-tap interpolation filters having different filter coefficients can be used to generate the pixel information less than an integer pixel in the unit of ⅛ pixel.

The motion prediction module can perform motion prediction on the basis of the reference picture interpolated by the reference picture interpolation module. Various methods such as FBMA (Full search-based Block Matching Algorithm), TSS (Three Step Search), and NTS (New Three-Step Search Algorithm) can be used to derive a motion vector. A motion vector has a motion vector value in the unit of ½ or ¼ pixel on the basis of the interpolated pixel. The motion prediction module can predict a current prediction unit using different motion prediction methods. Various methods such as a skip method, a merging method, and an AMVP (Advanced Motion Vector Prediction) method can be used as the motion prediction method.

A method of constructing a predicted motion vector candidate list at the time of performing inter prediction using the AMVP method according to an embodiment of the invention will be described below.

The intra prediction module can generate a prediction unit on the basis of reference pixel information around a current block which is pixel information in the current picture. When the blocks around the current prediction unit are blocks having been subjected to the inter prediction and a reference pixel is a pixel having been subjected to the inter prediction, reference pixels of the block having been subjected to the inter prediction can be replaced with the reference pixel information of the peripheral blocks having been subjected to the intra prediction. That is, when a reference pixel is not available, the reference pixel information not available can be replaced with at least one reference pixel of the available reference pixels.

The prediction mode of intra prediction includes a directive prediction mode in which reference pixel information is used depending on the prediction direction and a non-directive prediction mode in which directivity information is not used to perform prediction. The mode for predicting luma information and the mode for predicting chroma information may be different from each other. Intra prediction mode information obtained by luma information or predicted luma signal information may be used to predict the chroma information.

When the size of a prediction unit and the size of a transform unit are equal to each other at the time of performing intra prediction, the intra prediction of the prediction unit can be performed on the basis of pixels located on the left side of the prediction unit, a pixel located at the left-top end, and pixels located at the top. On the other hand, when the size of a prediction unit and the size of a transform unit are different from each other at the time of perform intra prediction, the intra prediction can be performed using reference pixels based on the transform unit. Intra prediction using N×N dividing for only the minimum coding unit can be performed.

In the intra prediction method, an MDIS (Mode Dependent Intra Smoothing) filter is applied to reference pixels depending on the prediction mode and then a predicted block can be generated. The type of the MDIS filter applied to the reference pixels may vary. In the intra prediction method, the intra prediction mode of a current prediction unit can be predicted from the intra prediction mode of a prediction unit located around the current prediction unit. When the prediction mode of the current prediction unit is predicted using the mode information predicted from the peripheral prediction units and the intra prediction modes of the current prediction unit and the peripheral prediction units are equal to each other, information representing that the prediction modes of the current prediction unit and the peripheral prediction units are equal to each other can be transmitted using predetermined flag information. When the prediction modes of the current prediction unit and the peripheral prediction units are different from each other, the prediction mode information of the current block can be encoded by performing entropy encoding.

A residual block including residual information which is a difference between a prediction unit subjected to the prediction and the original block of the prediction unit can be generated on the basis of the prediction unit generated by the prediction module 110. The generated residual block can be input to the transform module 115. The transform module 115 can transform the original block and the residual block including the residual information of the prediction unit generated by the prediction module 110 using a transform method such as DCT (Discrete Cosine Transform) or DST (Discrete Sine Transform). Which of the DCT and the DST to use to transform the residual block can be determined on the basis of the intra prediction mode information of the prediction unit used to generate the residual block.

The quantization module 120 can quantize values transformed into the frequency domain by the transform module 115. The quantization coefficients can be changed depending on the block or the degree of importance of a picture. The values calculated by the quantization module 120 can be supplied to the inverse quantization module 135 and the rearrangement module 125.

The rearrangement module 125 can rearrange the coefficient values relative to the quantized residual values.

The rearrangement module 125 can change two-dimensional block type coefficients to one-dimensional vector type coefficients through the use of a coefficient scanning method. For example, the rearrangement module 125 can scan DC coefficients to coefficients of the high frequency domain using a zig-zag scanning method and can change the scanned coefficients to one-dimensional vector type coefficients. A vertical scanning method of scanning two-dimensional block type coefficients in the column direction and a horizontal scanning method of scanning two-dimensional block type coefficients in the row direction can be used instead of the zig-zag scanning method depending on the size of a transform unit and the intra prediction mode. That is, which of the zig-zag scanning method, the vertical scanning method, and the horizontal scanning method to use can be determined depending on the size of a transform unit and the intra prediction mode.

The entropy encoding module 130 can perform entropy encoding on the basis of the values calculated by the rearrangement module 125. Various encoding methods such as exponential golomb coding, VLC (Variable length Coding), and CABAC (Context-Adaptive Binary Arithmetic Coding) can be used for the entropy encoding.

The entropy encoding module 130 can encode a variety of information such as residual coefficient information and block type information of a coding unit, prediction mode information, dividing unit information, prediction unit information, transfer unit information, motion vector information, reference frame information, block interpolation information, and filtering information from the rearrangement module 125 and the prediction module 110.

The entropy encoding module 130 can entropy-encode coefficient values of the coding unit input from the rearrangement module 125.

The inverse quantization module 135 and the inverse transform module 140 inversely quantize the values quantized by the quantization module 120 and inversely transforms the values transformed by the transform module 115. The residual values generated by the inverse quantization module 135 and the inverse transform module 140 can be merged with the prediction unit, which is predicted by the motion vector prediction module, the motion compensation module, and the intra prediction module of the prediction module 110, to generate a reconstructed block.

The filter module 145 can include at least one of a deblocking filter, an offset correction module, and an ALF (Adaptive Loop Filter).

The deblocking filter 145 can remove block distortion generated due to the boundary between blocks in the reconstructed picture. Whether the deblocking filter should be applied to a current block can be determined on the basis of the pixels included in several rows or columns of the block. When the deblocking filter is applied to a block, a strong filter or a weak filter can be applied depending on the necessary deblocking filtering strength. When performing horizontal filtering and vertical filtering for applying the deblocking filter, the horizontal filtering and the vertical filtering can be performed in parallel.

The offset correction module can correct an offset of the picture subjected to the deblocking from the original picture in the unit of pixels. A method of dividing the pixels of a picture into a predetermined number of regions, determining a region to be subjected to the offset correction, and applying the offset correction to the determined region or a method of applying the offset correction in consideration of edge information of each pixel can be used to perform the offset correction on a specific picture.

The ALF (Adaptive Loop Filter) can perform filtering on the basis of comparison result of the filtered reconstructed picture and the original picture. The pixels included in a picture can be divided into predetermined groups, a filter to be applied to each group can be determined, and the filtering can be differently performed for each group. Information on whether the ALF should be applied and luma signals can be transferred by the coding units (CU) and the size and coefficients of the ALF to be applied to each block can vary. The ALF can have various types and the number of coefficients included in the corresponding filter can vary. The filtering-related information (such as filter coefficient information, ALF ON/OFF information, and filter type information) of the ALF can be included and transferred in a predetermined parameter set of a bitstream.

The memory 150 can store the reconstructed block or picture calculated by the filter module 145 and the stored reconstructed block or picture can be supplied to the prediction module 110 when performing the intra prediction.

Figure 2:
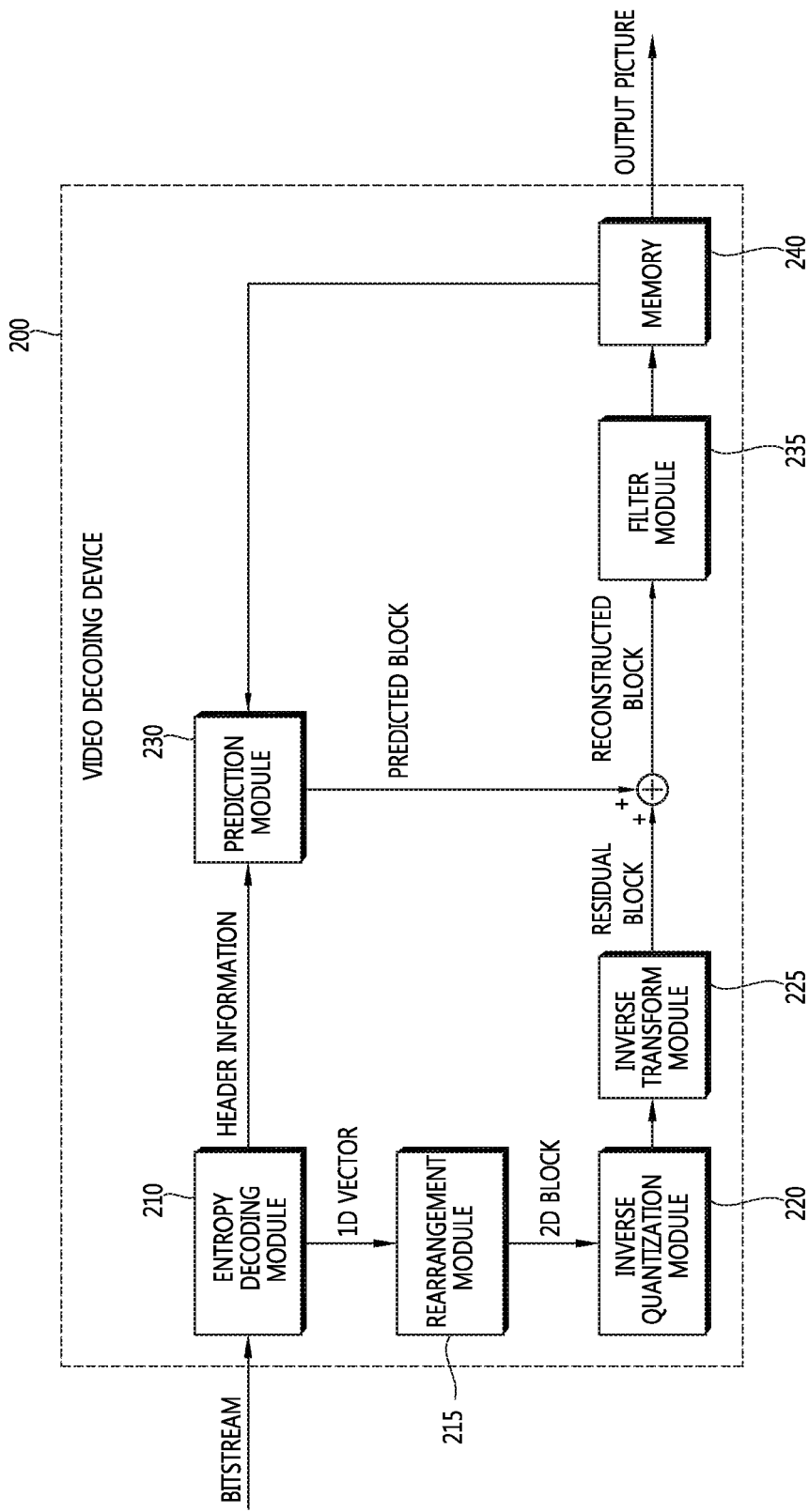
FIG. 2 is a block diagram illustrating an image decoding device according to another embodiment of the invention.

FIG. 2 is a block diagram illustrating an image decoding device according another embodiment of the invention.

Referring to FIG. 2, an image decoding device 200 includes an entropy decoding module 210, a rearrangement module 215, an inverse quantization module 220, an inverse transform module 225, a prediction module 230, a filter module 235, and a memory 240.

When an image bitstream is input from the image encoding device, the input bitstream can be decoded in the inverse order of that in the image encoding device.

The entropy decoding module 210 can perform entropy decoding in the inverse order of the order of performing the entropy encoding in the entropy encoding module of the image encoding device. The residual values subjected to the entropy decoding by the entropy decoding module can be input to the rearrangement module 215.

The entropy decoding module 210 can decode information associated with the intra prediction and the inter prediction performed by the encoding device. As described above, when the image encoding device has predetermined restrictions in performing the intra prediction and the inter prediction, the entropy decoding module can perform the entropy decoding based on the restrictions and can be supplied with the information of a current block associated with the intra prediction and the inter prediction.

The rearrangement module 215 can perform rearrangement on the bitstream entropy-decoded by the entropy decoding module 210 on the basis of the rearrangement method of the encoding module. The rearrangement module can reconstruct and rearrange coefficients expressed in the form of one-dimensional vector into two-dimensional block type coefficients. The rearrangement module can be supplied with information associated with the coefficient scanning performed by the encoding module and can perform the rearrangement using a method of inversely scanning the coefficients on the basis of the scanning order in which the scanning is performed by the corresponding encoding module.

The inverse quantization module 220 can perform inverse quantization on the basis of the quantization parameters supplied from the encoding device and the rearranged coefficient values of the block.

The inverse transform module 225 can perform the inverse DCT and inverse DST of the DCT and DST, which has been performed by the transform module, on the quantization result from the image encoding device. The inverse transform can be performed on the basis of a transfer unit determined by the image encoding device. The transform module of the image encoding device can selectively perform the DCT and DST depending on plural information elements such as the prediction method, the size of the current block, and the prediction direction, and the inverse transform module 225 of the image decoding device can perform the inverse transform on the basis of the transform information on the transform performed by the transform module of the image encoding device.

The inverse transform can be performed by the coding units instead of the transform units having been subjected to the transform.

The prediction module 230 can generate a predicted block on the basis of predicted block generation information supplied from the entropy decoding module 210 and the previously-decoded block or picture information supplied from the memory 240.

As described above, similarly to the operation of the image encoding device, when the size of a prediction unit and the size of a transform unit are equal to each other at the time of performing the intra prediction, the intra prediction on the prediction unit is performed on the basis of pixels located on the left side of the prediction unit, a pixel located at the top-left corner, and pixels located on the top side. On the other hand, when the size of a prediction unit and the size of a transform unit are different from each other at the time of perform intra prediction, the intra prediction can be performed using reference pixels based on the transform unit. Intra prediction using N×N dividing for only the minimum coding unit can be performed.

The prediction module 230 includes a prediction unit determination module, an inter prediction module, and an intra prediction module. The prediction unit determination module can receive a variety of information such as prediction unit information input from the entropy decoding module, prediction mode information of the intra prediction method, and motion prediction-related information of the inter prediction method, can separate a prediction unit from the current coding unit, and can determine which of the inter prediction and the intra prediction should be performed on the prediction unit. The inter prediction module can perform the inter prediction on the current prediction unit on the basis of information included in at least one picture of a previous picture and a subsequent picture of the current picture including the current prediction unit using information necessary for the inter prediction of the current prediction unit supplied from the image encoding device.

In order to perform the inter prediction, it can be determined which of a skip mode, a merging mode, and an AMVP mode is the motion prediction method of the prediction unit included in the coding unit on the basis of the coding unit.

Hereinafter, a method of constructing a predicted motion vector candidate list at the time of performing inter prediction using the AMVP method according to an embodiment of the invention will be described below.

The intra prediction module can generate a predicted block on the basis of pixel information in the current picture. When a prediction unit is the prediction unit subjected to the intra prediction, the intra prediction can be performed on the basis of the intra prediction mode information of the prediction unit supplied from the image encoding device. The intra prediction module include an MDIS filter, a reference pixel interpolation module, and a DC filter. The MDIS filter is a module that performs filtering on the reference pixels of the current block and can be applied by determining whether the filter should be applied depending on the prediction mode of the current prediction unit. The MDIS filter can be performed on the reference pixels of the current block using the prediction mode of the prediction unit supplied from the image encoding device and the MDIS filter information. When the prediction mode of the current block is a mode in which the MDIS filtering is not performed, the MDIS filter may not be applied.

When the prediction mode of the prediction unit is a prediction unit to be subjected to the intra prediction on the basis of the pixel values obtained by interpolating the reference pixels, the reference pixel interpolation module can generate reference pixels in the unit of pixels less than an integer by interpolating the reference pixels. When the prediction mode of the current prediction unit is a prediction mode in which a predicted block is generated without interpolating the reference pixels, the reference pixels may not be interpolated. When the prediction mode of the current block is the DC mode, the DC filter can generate a predicted block through filtering.

The reconstructed block or picture can be supplied to the filter module 235. The filter module 235 includes a deblocking filter, an offset correction module, and an ALF.

Information on whether the deblocking filter is applied to the corresponding block or picture and information on which of the strong filter and the weak filter has been applied when the deblocking filter has been applied can be supplied from the image encoding device. The deblocking filter of the image decoding device can be supplied with the deblocking filter-related information from the image encoding device and can perform deblocking filtering on the corresponding block in the decoding device. Similarly to the image encoding device, the vertical deblocking filtering and the horizontal deblocking filter are first performed, where at least one of the vertical deblocking filtering and the horizontal deblocking filtering can be performed on an overlapping portion. The vertical deblocking filtering or the horizontal deblocking filtering which is not previously performed can be performed on the portion in which the vertical deblocking filtering and the horizontal deblocking filtering overlap. The parallel processing of the deblocking filtering processes can be performed through this deblocking filtering.

The offset correction module can perform offset correction on the reconstructed picture on the basis of the type of the offset correction applied to the picture in encoding and the offset value information.

The ALF can perform the filtering on the basis of the comparison result between the reconstructed picture subjected to the filtering and the original picture. The ALF can be applied to the coding unit on the basis of the ALF application information and the ALF coefficient information supplied from the encoding device. The ALF information can be included and supplied in a specific parameter set.

The memory 240 can store the reconstructed picture or block for use as a reference picture or a reference block and can supply the reconstructed picture to an output module.

As described above, in the embodiments of the invention, the coding unit is used as a term representing an encoding unit, but may be used as a unit of decoding as well as encoding.

An image encoding method and an image decoding method to be described later in the embodiments of the invention can be performed by the constituents of the image encoding device and the image decoding device described above with reference to FIGS. 1 and 2. The constituents may include software process units which can be performed through algorithms, as well as hardware constituents.

An intra prediction method according to an embodiment of the invention may be used instead of the existing intra prediction method, or may be selectively used along with the existing intra prediction mode on the basis of flag information. The intra prediction mode according to the embodiment of the invention can be called advanced intra prediction (AIP) mode. Information of advanced_intra_pred_flag which is information representing whether prediction should be performed using the advanced intra prediction (AIP) mode or using a conventional prediction method instead of the advanced intra prediction (AIP) mode can be transmitted in a state where the information is loaded onto a predetermined generic syntax structure such as a SPS (Sequence Parameter Set) or a PPS (Picture Parameter Set) or a slicer header. The AIP mode can be transmitted for a luma signal or a chroma signal. The AIP mode can be transmitted using advanced_intra_pred_flag for the luma signal, and can be transmitted using advanced_intra_pred_chroma_flag for the chroma signal.

Figure 3:
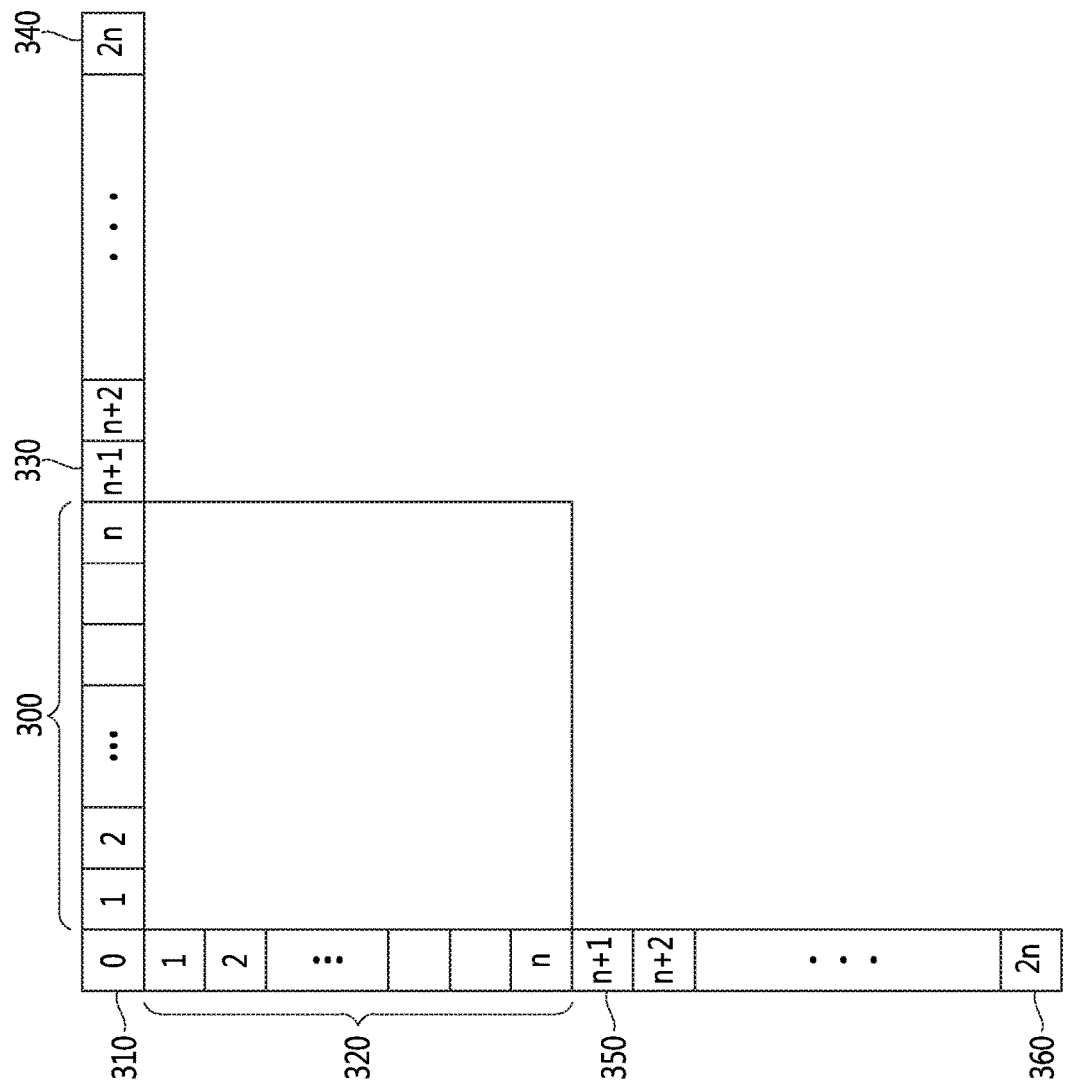
FIG. 3 is a diagram illustrating a prediction unit and reference pixels according to the embodiment of the invention.

FIG. 3 is a diagram illustrating a prediction unit and reference pixels in the embodiment of the invention.

Referring to FIG. 3, the reference pixels in the embodiment of the invention can be classified into top reference pixels 300, a top-left reference pixel 310, and left reference pixels 320.

When the size of a block is n×n and the number of top reference pixels is n, a reference pixel located at a first position out of the top reference pixels is referred to as a first top reference pixel, a pixel located on the leftmost side is referred to as an n-th top reference pixel, a pixel located on the top out of the left reference pixels is referred to as a first left reference pixel, and a pixel located on the bottom is referred to as an n-th left reference pixel. In this way, sequentially, a pixel located at the (n+1)-th position on the just right side of the n-th top reference pixel is referred to as an (n+1)-th top reference pixel 330, and a pixel located at the 2n-th position is referred to as a 2n-th top reference pixel 340. Similarly, an (n+1)-th pixel located just below the n-th left reference pixel is referred to as an (n+1)-th left reference pixel 350 and a pixel located at the 2n-th position is referred to as a 2n-th bottom reference pixel 360.

Columns and rows in a prediction unit can be expressed by first to n-th rows and first to n-th columns with respect to the row and column including pixels.

FIG. 4 is a conceptual diagram illustrating an intra prediction method using an advanced DC mode according to an embodiment of the invention.

Referring to FIG. 4, a bottom-right pixel 410 is set to a DC-predicted value so as to perform intra prediction using a DC mode (400).

The DC-predicted value can be derived using the average value of the top reference pixels, the left reference pixels, and the top-left pixel, and this value can be used as the predicted value of the bottom-right pixel 410.

The predicted values of the n-th column can be derived using the bottom-right pixel 410 and the n-th top reference pixel 423, and the predicted values of the n-th row can be derived using the bottom-right pixel 410 and the n-th left reference pixel 426 (420).

Bidirectional linear prediction is performed to derive the predicted values of pixels included in the remaining prediction unit other than the n-th row and the n-th column (440).

That is, the predicted values of the pixels included in the remaining prediction unit other than the n-th row and the n-th column can be generated by performing linear prediction on the top reference pixel 445 located on the top in the vertical direction, the pixel 450 in the n-th row located on the bottom in the vertical direction, the left reference pixel 455 located on the left in the horizontal direction, and the pixel 460 in the n-th column on the right side in the horizontal direction.

Figure 5:
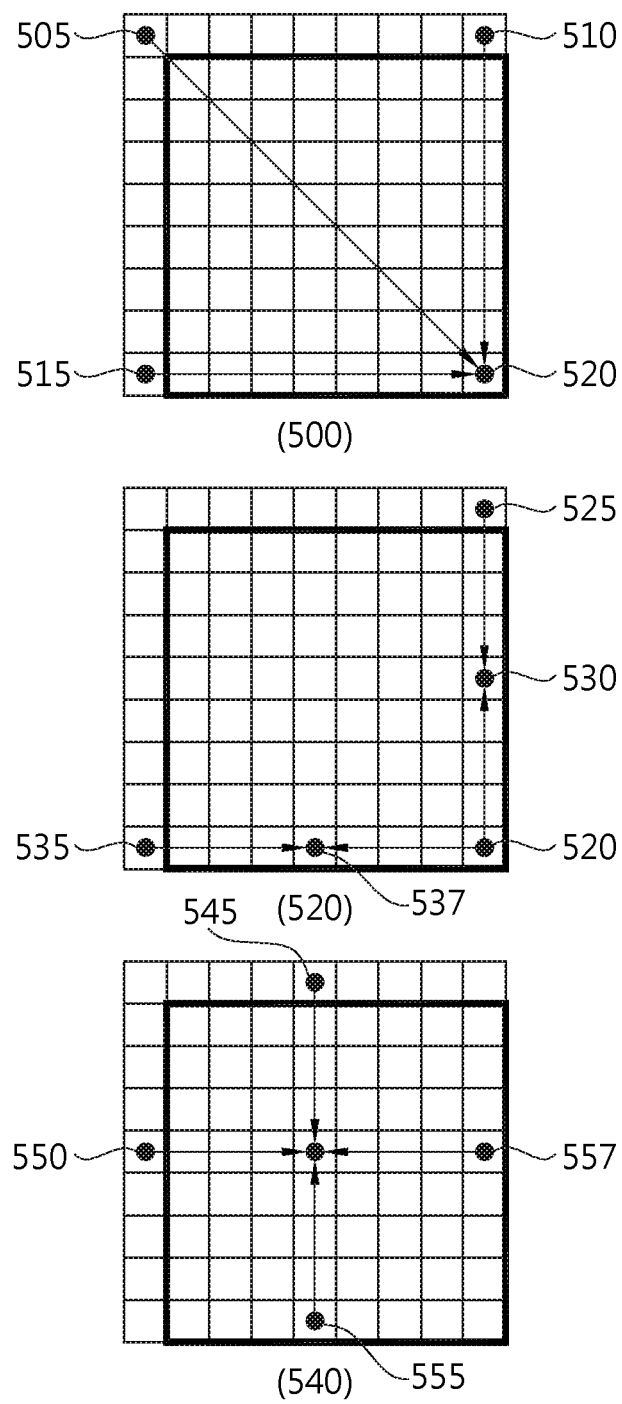
FIG. 5 is a conceptual diagram illustrating an intra prediction method using an advanced DC mode according to the embodiment of the invention.

FIG. 5 is a conceptual diagram illustrating an intra prediction method using an advanced DC mode according to an embodiment of the invention.

Referring to FIG. 5, a bottom-right pixel 520 is generated using the average value of the top-left reference pixel 505, the n-th top reference pixel 510, and the n-th left reference pixel 515 (500).

The generated bottom-right pixel 520 and the n-th top reference pixel 525 are interpolated to generate the predicted values of the pixels 530 included in the n-th column, and the generated bottom-right pixel 520 and the n-th left reference pixel 535 are interpolated to generate the predicted values of the pixels 537 included in the n-th row.

Linear interpolation is performed and predetermined weight values are given to the bottom-right pixel 520 and the n-th top reference pixel 525 to generate the predicted values of the pixels included in the n-th column. Similarly, the bottom-right pixel 520 and the n-th left reference pixel 535 are interpolated to generate the predicted values of the pixels included in the n-th row.

The predicted values of the pixels included in the remaining prediction unit other than the n-th row and the n-th column are derived by performing bidirectional linear prediction on the basis of the top reference pixels 545 located on the top in the vertical direction, the left reference pixels 550, the generated predicted values of the pixels 555 included in the n-th row, and the generated predicted values of the pixels 557 included in the n-th column (560).

Figure 6:
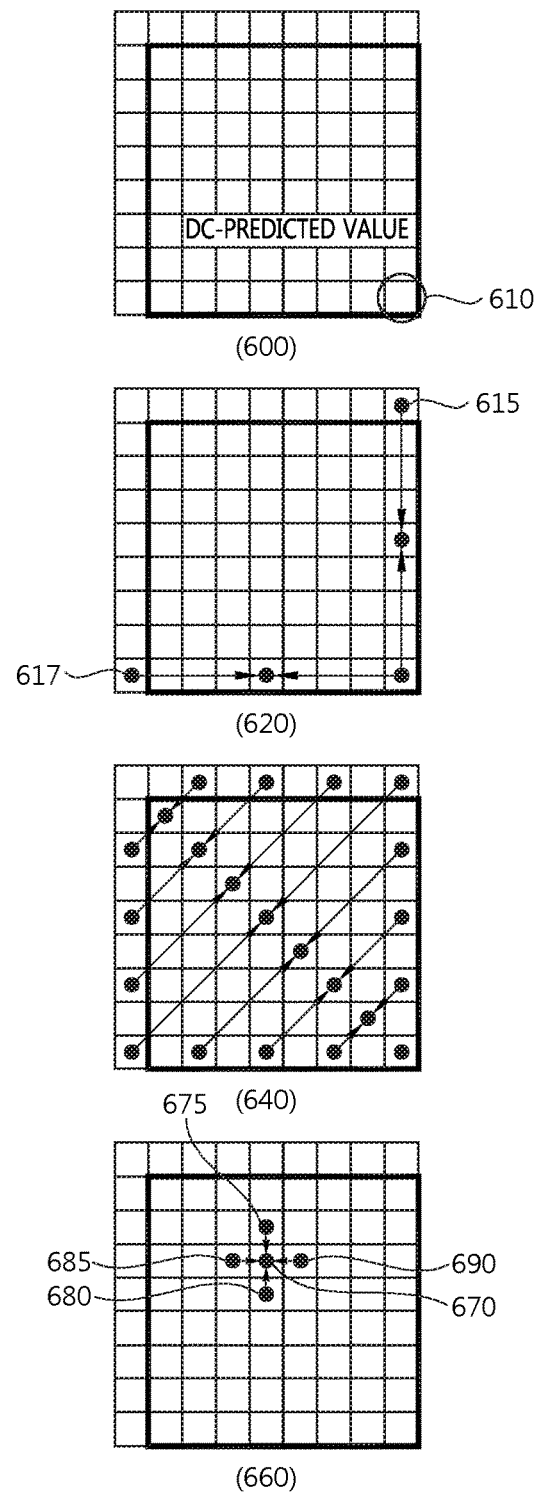
FIG. 6 is a conceptual diagram illustrating an intra prediction method using an advanced DC mode according to the embodiment of the invention.

FIG. 6 is a conceptual diagram illustrating an intra prediction method using an advanced DC mode according to an embodiment of the invention.

Referring to FIG. 6, the bottom-right pixel is set to a DC-predicted value (600).

The DC-predicted value of the bottom-right pixel 610 can be generated by calculating the average value of the top reference pixels, the left reference pixels, and the top-left pixel.

The n-th top reference pixel 615 and the bottom-right pixel 610 are interpolated to generate the predicted values of the pixels included in the n-th column, and the n-th left reference pixels 617 and the bottom-right reference pixel 610 are interpolated to generate the predicted values of the pixels included in the n-th row (620).

The predicted values of the pixels included in the remaining prediction unit other than the n-th row and the n-th column are generated on the basis of the reference pixel values present in the diagonal direction and the predicted pixel values of the n-th row and the n-th column (640).

First predicted values of the pixels included in the remaining prediction unit other than the n-th row and the n-th column can be generated by performing linear interpolation using one pixel value present on the top-right side in the diagonal direction out of the existing reference pixel values and the pixel values of the n-th row and the n-th column and one pixel value present on the bottom-left side.

Second predicted values 670 are generated by performing bidirectional linear prediction using two pixels in the horizontal direction and two pixels in the vertical direction, which are present around the first predicted values of the pixels included in the remaining prediction unit other than the n-th row and the n-th column (660).

The pixel 675 located just above in the vertical direction of the current prediction pixel, the pixel 680 located just below in the vertical direction of the current prediction pixel, the pixel 685 located on the just left side in the horizontal direction of the current prediction pixel, and the pixel 690 located on the just right side in the horizontal direction of the current prediction pixel are interpolated to generate the second predicted values 670.

Figure 7:
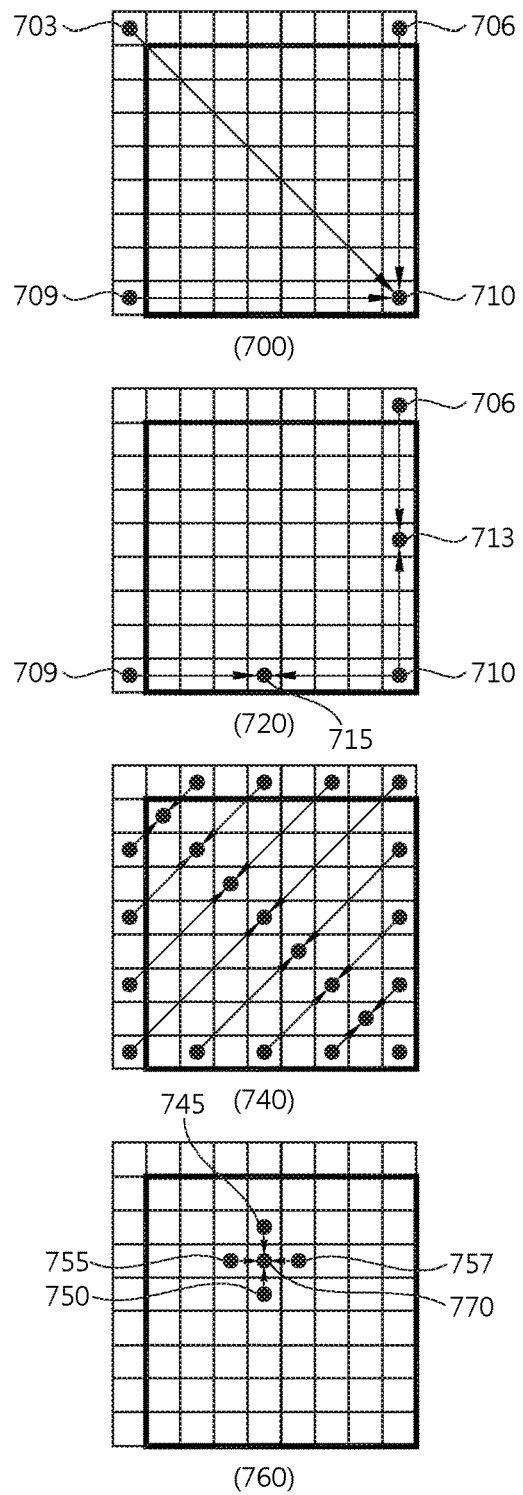
FIG. 7 is a conceptual diagram illustrating an intra prediction method using an advanced DC mode according to an embodiment of the invention.

FIG. 7 is a conceptual diagram illustrating an intra prediction method using an advanced DC mode according to an embodiment of the invention.

Referring to FIG. 7, the bottom-right pixel 710 is generated (700) using the average of the top-left reference pixel 703, the n-th top reference pixel 706, and the n-th left reference pixel 709.

The n-th top reference pixel 706 and the bottom-right pixel 710 are interpolated to generate the predicted values 713 of the pixels included in the n-th column, and the n-th left reference pixels 709 and the bottom-right pixel 710 are interpolated to generate the predicted values of the pixels 715 included in the n-th row (720).

The predicted values of the pixels included in the remaining prediction unit other than the n-th row and the n-th column are generated on the basis of the reference pixel values located in the diagonal direction and the predicted pixel values of the n-th row and the n-th column (740).

The first predicted values of the pixels included in the remaining prediction unit other than the n-th row and the n-th column can be generated by performing interpolation using one pixel value located on the top-right side in the diagonal direction (for example, 45 degrees) out of the existing reference pixel values and the predicted pixel values of the n-th row and the n-th column and one pixel value located on the bottom-left side.

The second predicted values are generated by performing bidirectional linear prediction using two pixels in the horizontal direction and two pixels in the vertical direction located around the first predicted values of the pixels included in the remaining prediction unit other than the n-th row and the n-th column (760).

The pixel 745 located just above in the vertical direction of the current prediction pixel, the pixel 750 located just below in the vertical direction of the current prediction pixel, the pixel 755 located on the just left side in the horizontal direction of the current prediction pixel, and the pixel 757 located on the just right side in the horizontal direction of the current prediction pixel are interpolated to generate the second predicted values 770.

FIG. 8 is a conceptual diagram illustrating an intra prediction method using an advanced vertical mode according to an embodiment of the invention.

Referring to FIG. 8, the average values of the n-th left reference pixel 810 and each of the top reference pixel values are inserted into the n-th row (800).

Each pixel included in the n-th row may have the average value of the value the pixel included in the same column out of the top reference pixels and the n-th bottom-left reference pixel.

The predicted values of the pixels included in the rows other than the n-th row are generated by interpolating the pixels included in the n-th row and the top reference pixel values (850).

By employing this method, it is possible to express pixel value information linearly varying in the units of rows.

FIG. 9 is a conceptual diagram illustrating an intra prediction method using an advanced horizontal mode according to an embodiment of the invention.

Referring to FIG. 9, the average values of the (n+1)-th top reference pixel and each of the left reference pixels are inserted into the n-th column (900).

Each pixel included in the n-th column may have the average value of the value of the pixel included in the same row out of the left reference pixels and the (n+1)-th top reference pixel.

In another method, the average pixel values of the n-th top reference pixel and each of the left reference pixels may be inserted into the n-th column (925).

That is, each pixel included in the n-th column may have the average value of the pixel included in the same row out of the left reference pixels and the n-th top reference pixel.

The predicted values of the pixels included in the columns other than the n-th column by interpolating the pixels included in the n-th column and the top reference pixel values (950).

By employing this method, it is possible to express pixel value information varying in the units of rows.

Figure 10:
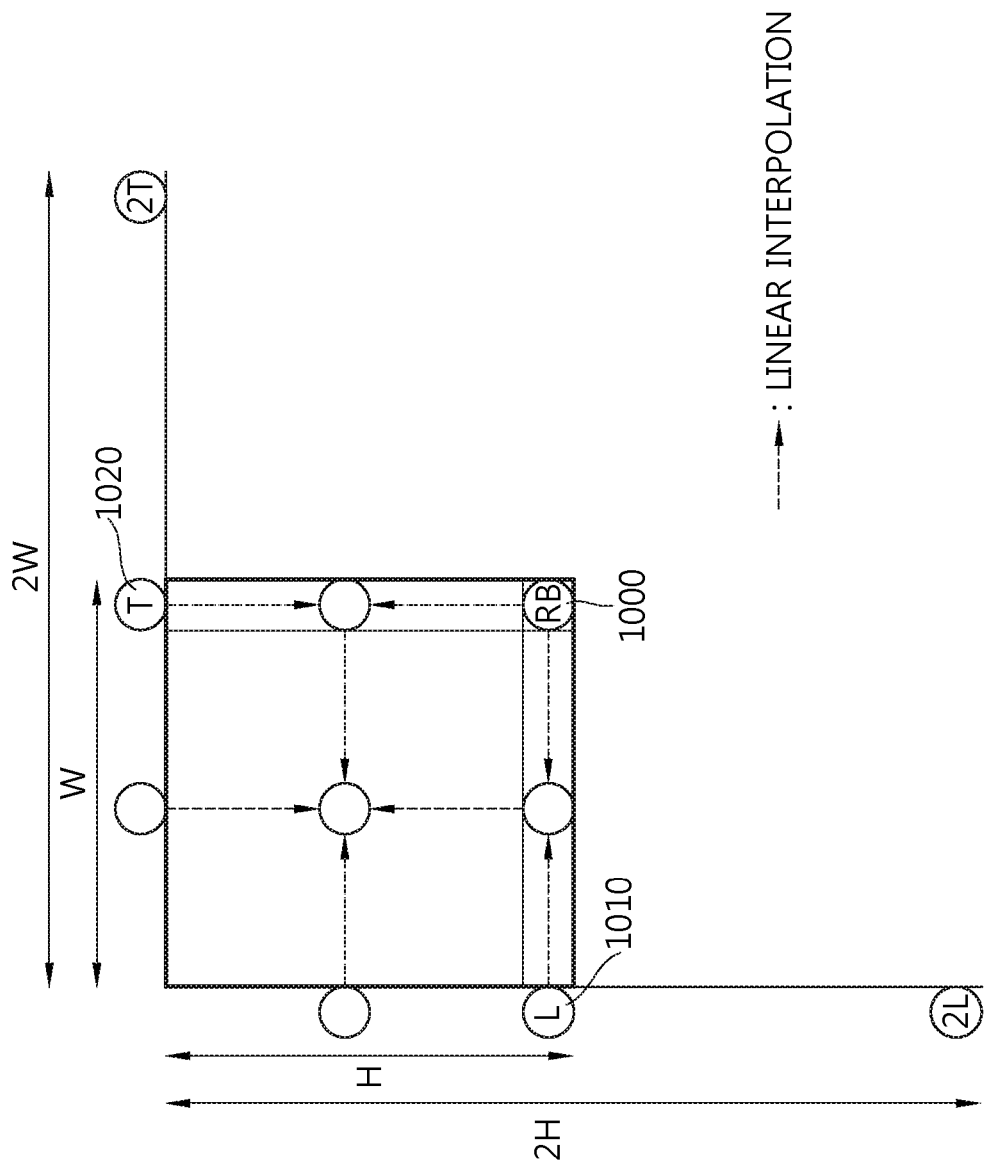
FIG. 10 is a conceptual diagram illustrating a method of deriving a prediction unit using an advanced planar mode according to an embodiment of the invention.

FIG. 10 is a conceptual diagram illustrating a method of deriving a prediction unit using an advanced planar mode according to an embodiment of the invention.

Referring to FIG. 10, the predicted value of the bottom-right pixel 1000 is derived to perform intra prediction using the planar mode. The interpolated value of the derived predicted value of the bottom-right pixel 1000 and the n-th left reference pixel 1010 is used as the predicted values of the pixels included in the n-th row, and the interpolated value of the derived predicted value of the bottom-right pixel 1000 and the n-th top reference pixel 1020 is used as the predicted values of the pixels included in the n-th column.

The predicted values of the pixels included in the remaining prediction unit other than the n-th row and the n-th column can be derived by performing bidirectional interpolation on the basis of the top reference pixels, the left reference pixels, the top-left reference pixel, and the predicted pixel values of the n-th column and the n-th row generated in the previous step.

Here, the bottom-right pixel can be derived using various methods. FIGS. 11 to 14 show methods of deriving the bottom-right pixel according to an embodiment tof the invention.

Figure 11:
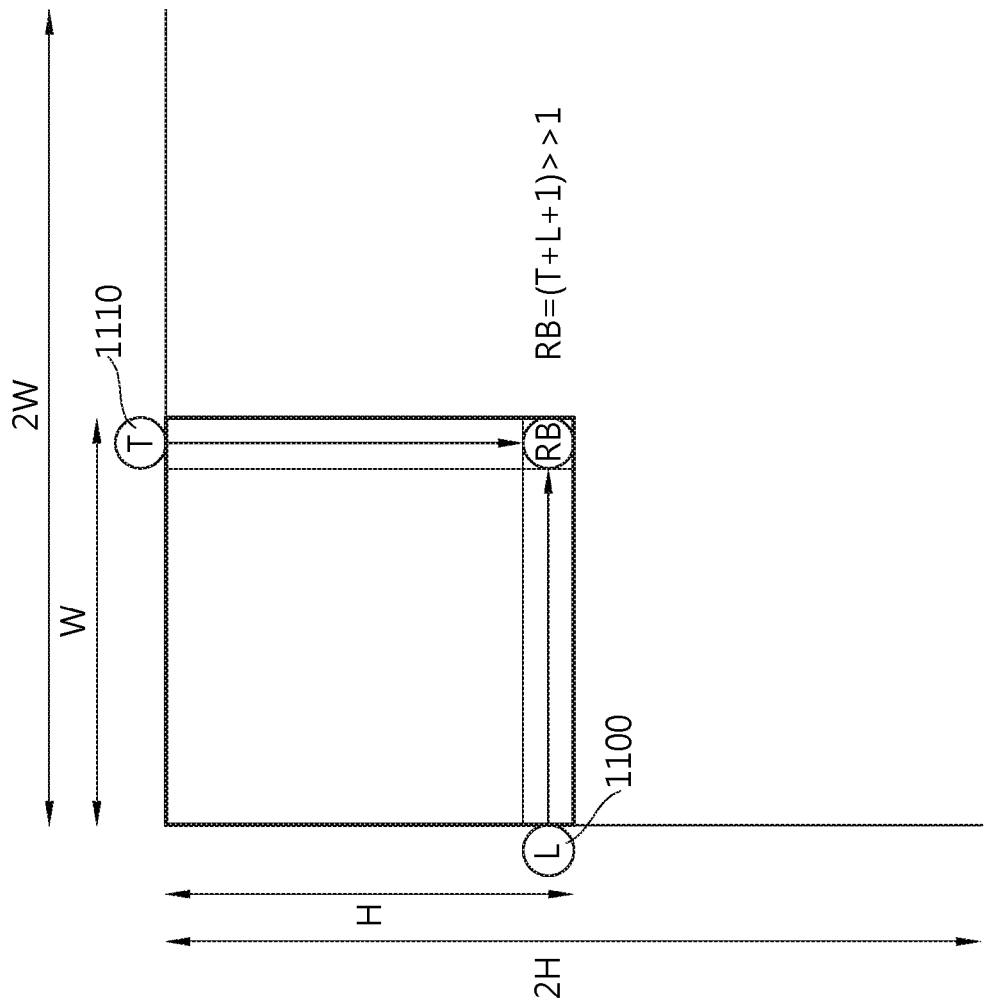
FIG. 11 is a conceptual diagram illustrating a method of deriving a lower-right pixel in the intra prediction method using an advanced planar mode according to an embodiment of the invention.

FIG. 11 is a conceptual diagram illustrating a method of deriving the bottom-right pixel in an intra prediction method using an advanced planar mode according to an embodiment of the invention.

Referring to FIG. 11, the bottom-right pixel can be derived from the average value of the n-th left reference pixel 1100 and the n-th top reference pixel 1110.

That is, by employing the method of deriving the bottom-right pixel value using only two pixel values, it is possible to reduce calculation complexity.

Figure 12:
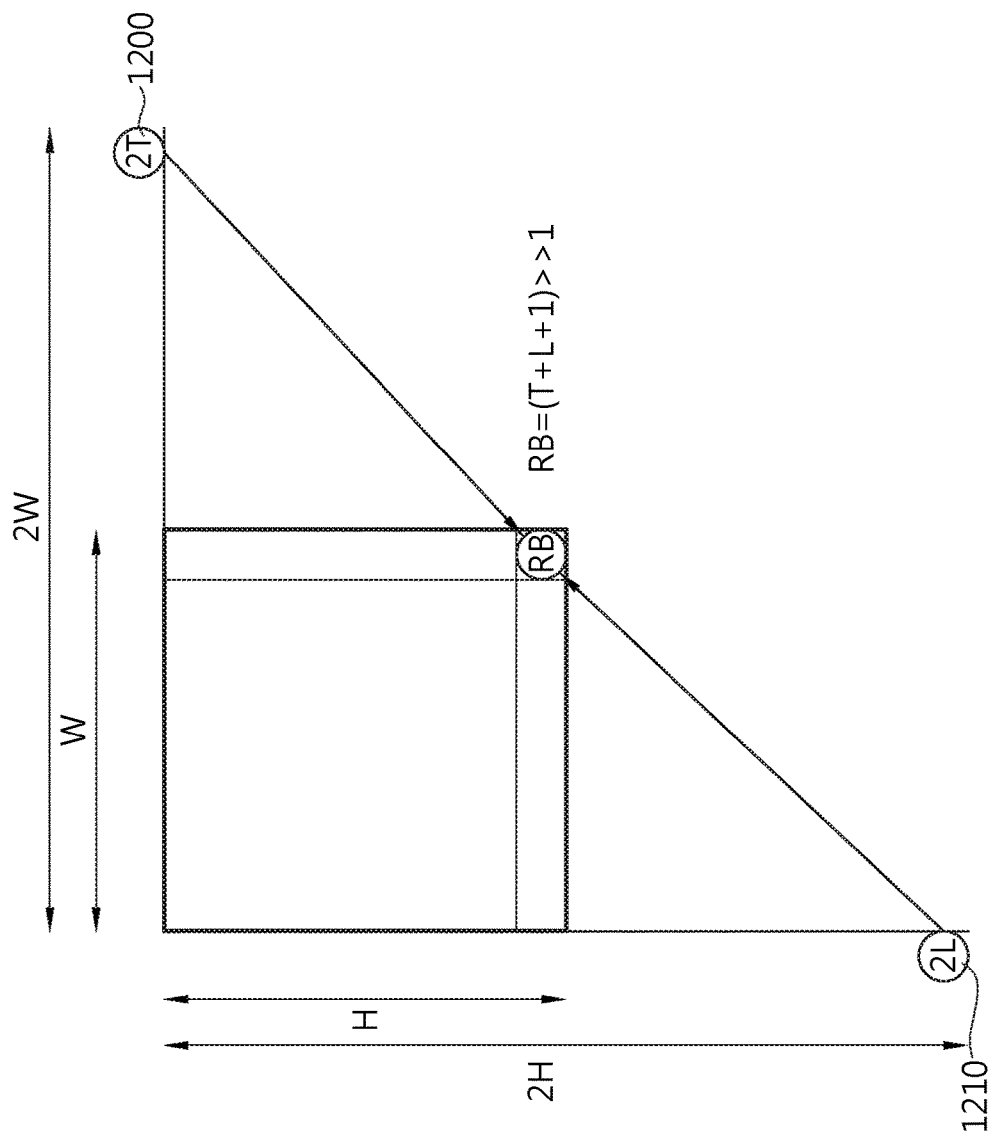
FIG. 12 is a conceptual diagram illustrating a method of deriving a lower-right pixel in the intra prediction method using an advanced planar mode according to an embodiment of the invention.

FIG. 12 is a conceptual diagram illustrating a method of deriving the bottom-right pixel in an intra prediction method using an advanced planar mode according to an embodiment of the invention.

Referring to FIG. 12, the bottom-right pixel can be derived from the average value the 2n-th top reference pixel 1200 and the 2n-th left reference pixel 1210.

That is, it is possible to derive the bottom-right pixel using only two pixel values, unlike the existing methods.

When a prediction unit is located at an edge and the 2n-th top reference pixel 1200 and the 2n-th left reference pixel 1210 are not present, the bottom-right pixel may be generated using the n-th left reference pixel value and the n-th top reference pixel value as shown in FIG. 11, or the bottom-right pixel may be generated using another method.

Figure 13:
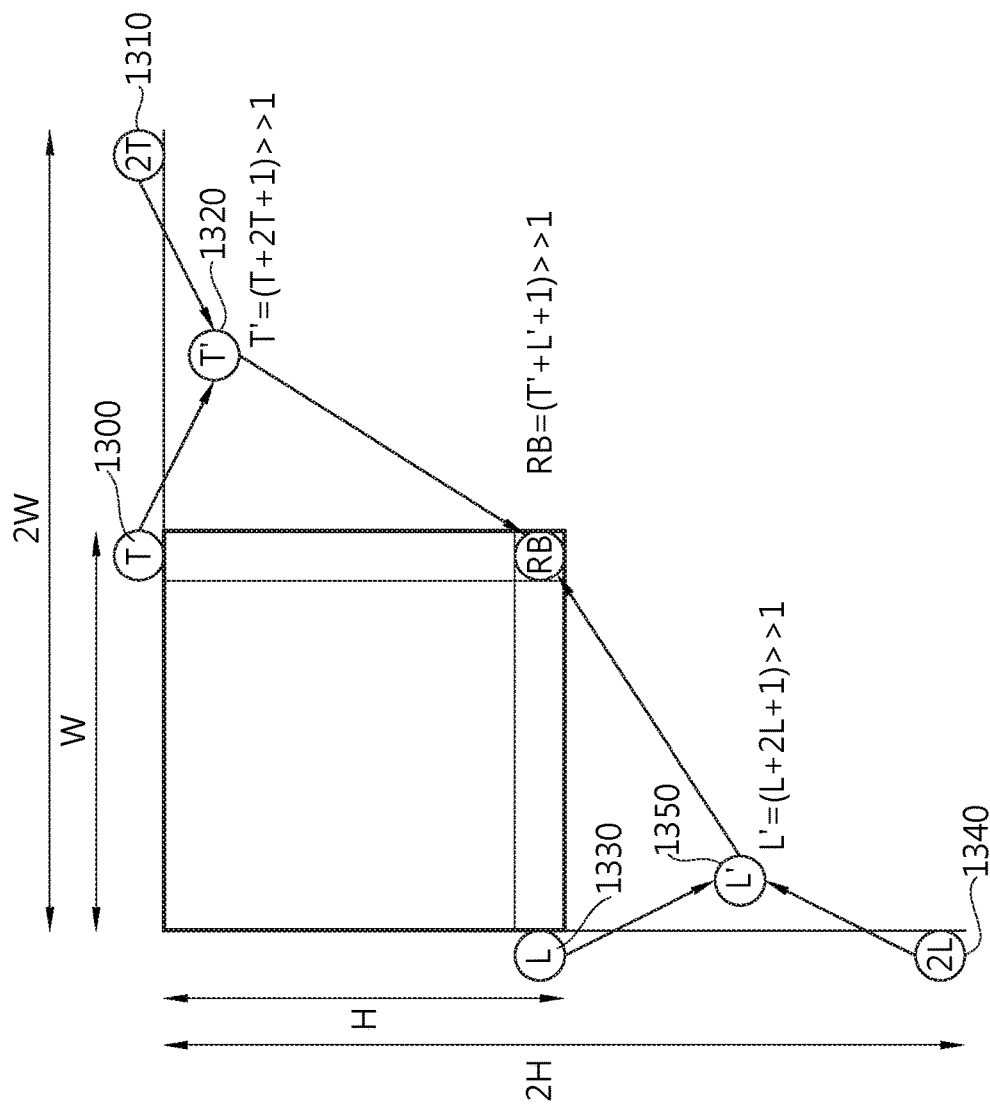
FIG. 13 is a conceptual diagram illustrating a method of deriving a lower-right pixel in the intra prediction method using an advanced planar mode according to an embodiment of the invention.

FIG. 13 is a conceptual diagram illustrating a method of deriving the bottom-right pixel in an intra prediction method using an advanced planar mode according to an embodiment of the invention.

Referring to FIG. 13, the bottom-right pixel can be derived using a top average pixel 1320 generated on the basis of the average value of the n-th top reference pixel 1300 and the 2n-th top reference pixel 1310 and a left average pixel 1350 derived on the basis of the average value of the n-th left reference pixel 1330 and the 2n-th left reference pixel 1340.

That is, the bottom-right pixel can be derived on the basis of the average value of the top average pixel 1320 and the left average pixel 1350.

When a prediction unit is located at an edge and the corresponding pixel is not present, the bottom-right pixel may be generated using the n-th left reference pixel value and the n-th top reference pixel value as shown in FIG. 11, or the bottom-right pixel may be generated using another method.

Figure 14:
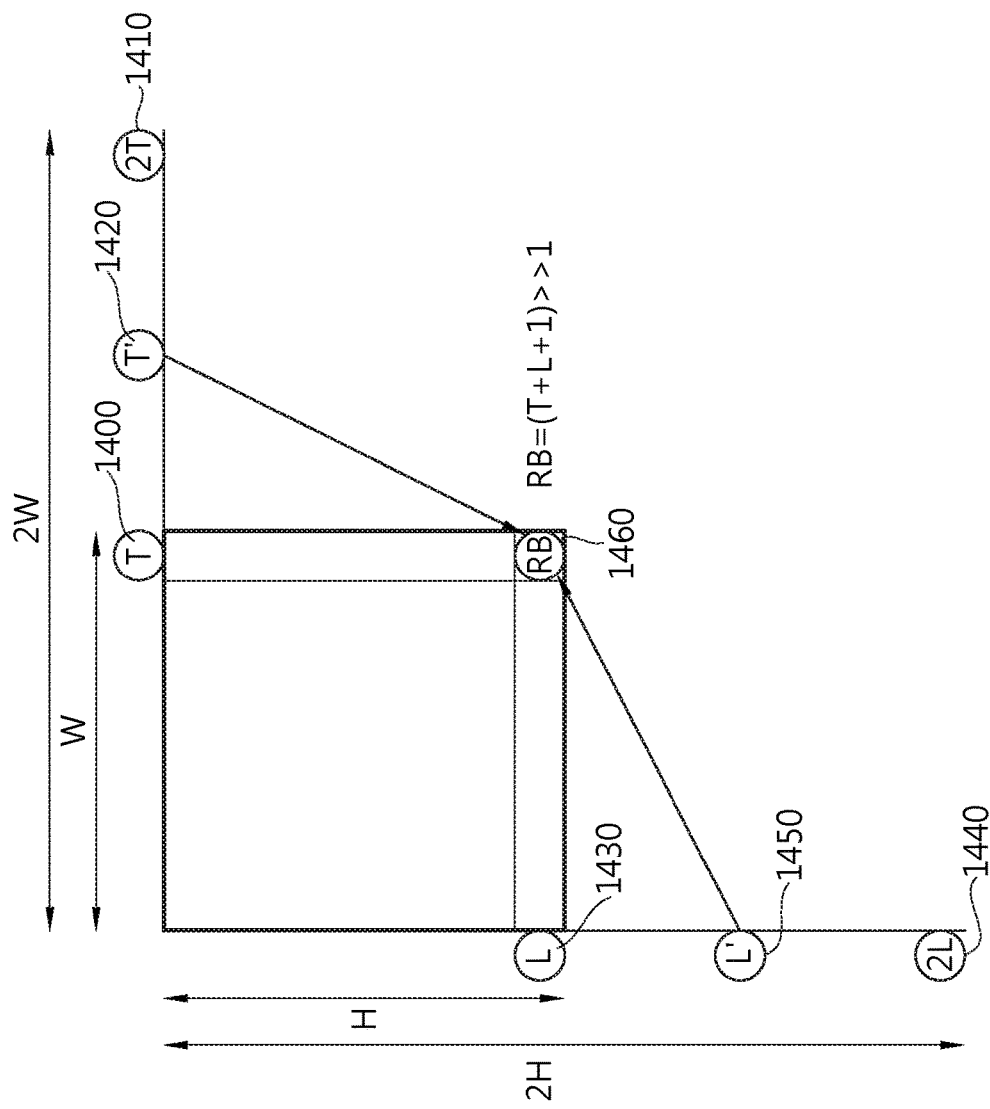
FIG. 14 is a conceptual diagram illustrating a method of generating a lower-right pixel in the intra prediction method using an advanced planar mode according to an embodiment of the invention.

FIG. 14 is a conceptual diagram illustrating a method of deriving the bottom-right pixel in an intra prediction method using an advanced planar mode according to an embodiment of the invention.

Referring to FIG. 14, the bottom-right pixel 1460 can be generated using the average value of a top middle pixel 1420 located in the middle between the n-th top reference pixel 1400 and the 2n-th top reference pixel 1410 and a left middle pixel 1450 located in the middle between the n-th left reference pixel 1430 and the 2n-th left reference pixel 1440. The pixel located in the middle may be the (n+n/2)-th top or left reference pixel located at the (n+n/2)-th or ((n+n/2)+1)-th position, or may be the ((n+n/2)+1)-th top or left reference pixel.

When a prediction unit is located at an edge and the corresponding pixel is not present, the bottom-right pixel may be generated using the n-th left reference pixel value and the n-th top reference pixel value, or the bottom-right pixel may be generated using another method.

Figure 15:
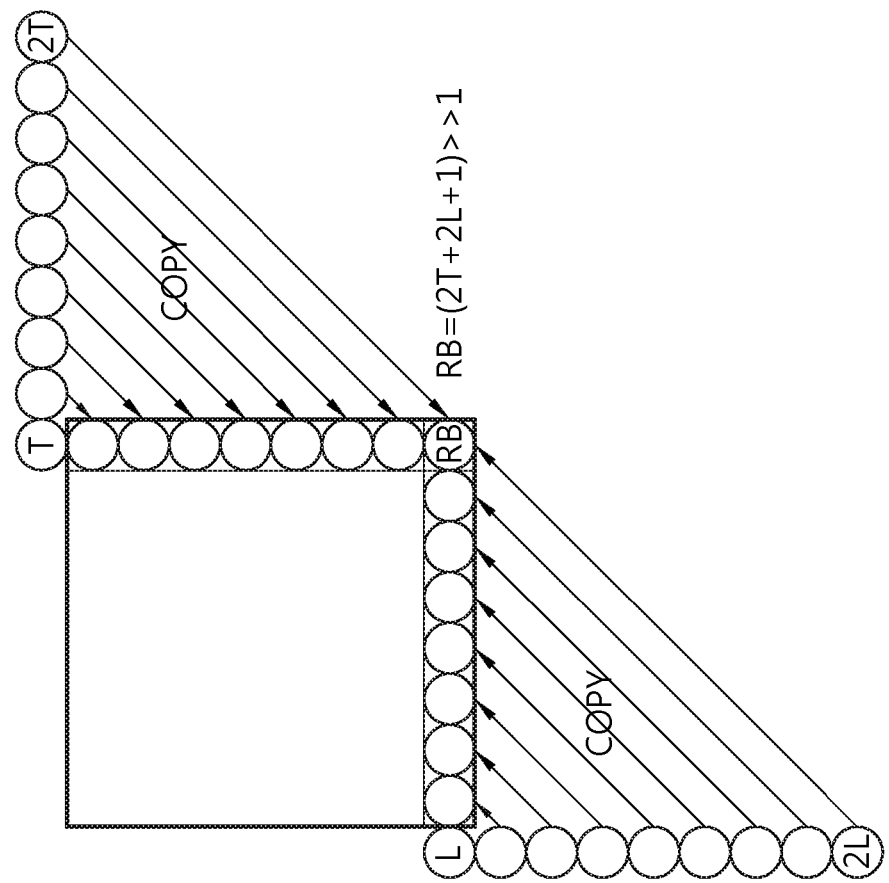
FIG. 15 is a conceptual diagram illustrating a method of generating an n-th row and an n-th column at the time of performing the planar mode according to an embodiment of the invention.
Figure 16:
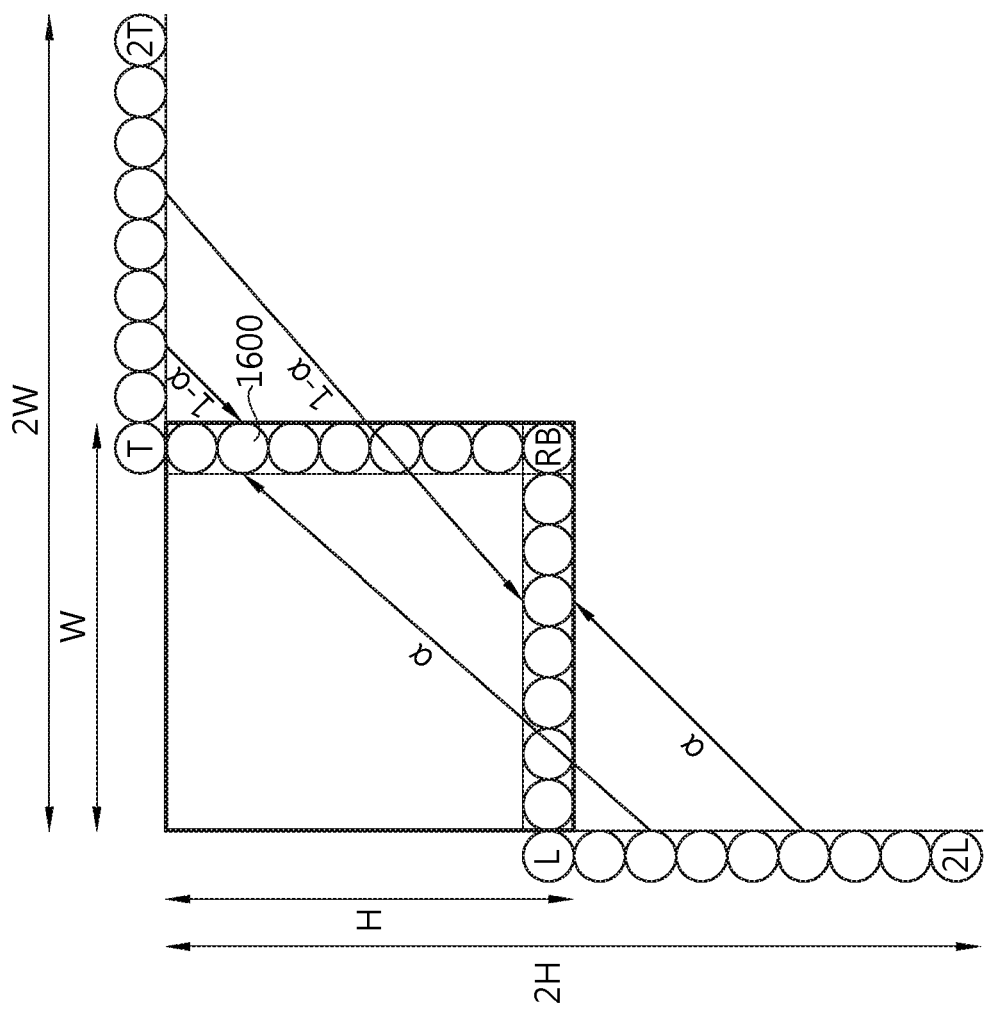
FIG. 16 is a conceptual diagram illustrating a method of generating the n-th row and the n-th column at the time of performing an advanced planar mode according to an embodiment of the invention.

FIGS. 15 and 16 are conceptual diagrams illustrating a method of generating the n-th row and the n-th column included in a prediction unit by interpolation in performing an advanced planar prediction mode.

FIG. 15 is a conceptual diagram illustrating a method of generating the n-th row and the n-th column in performing an advanced planar mode according to an embodiment of the invention.

Referring to FIG. 15, the predicted values of the pixels other than the bottom-right pixel included in the n-th column can be generated by copying the pixels of from the (n+1)-th top reference pixel to the (2n−1)-th top reference pixel.

The predicted values of the pixels other than the bottom-right pixel included in the n-th row can be generated by copying the pixels of from the (n+1)-th left reference pixel to the (2n−1)-th left reference pixel. The predicted value of the bottom-right pixel can be generated by calculating the average value of the 2n-th top Pixel and the 2n-th left pixel.

FIG. 16 is a conceptual diagram illustrating a method of generating the n-th row and the n-th column in performing an advanced planar mode according to an embodiment of the invention.

Referring to FIG. 16, the predicted values of the n-th column can be generated using the pixels generated by linearly predicting the pixels of from the (n+1)-th top reference pixel to the (2n−1)-th top reference pixel and the pixels of from the (n+1)-th left reference pixel to the (2n−1)-th left reference pixel depending on the distance therebetween. For example, the predicted value of the second pixel 1600 in the n-th column can be generated by linearly interpolating the (n+2)-th top reference pixel and the (n+2)-th left reference pixel.

Similarly, the predicted values of the n-th row can be generated using the pixels generated by linearly predicting the pixels of from the (n+1)-th top reference pixel to the (2n−1)-th top reference pixel and the pixels of from the (n+1)-th left reference pixel to the (2n−1)-th left reference pixel depending on the distance therebetween. For example, the predicted value of the second pixel in the n-th row can be generated by linearly interpolating the (n+2)-th top reference pixel and the (n+2)-th left reference pixel.

By employing this method, the predicted pixel values of the n-th row and the n-th column can be generated so as to have a more influence on a pixel value having a smaller distance and then prediction using the planar mode can be performed.

Figure 17:
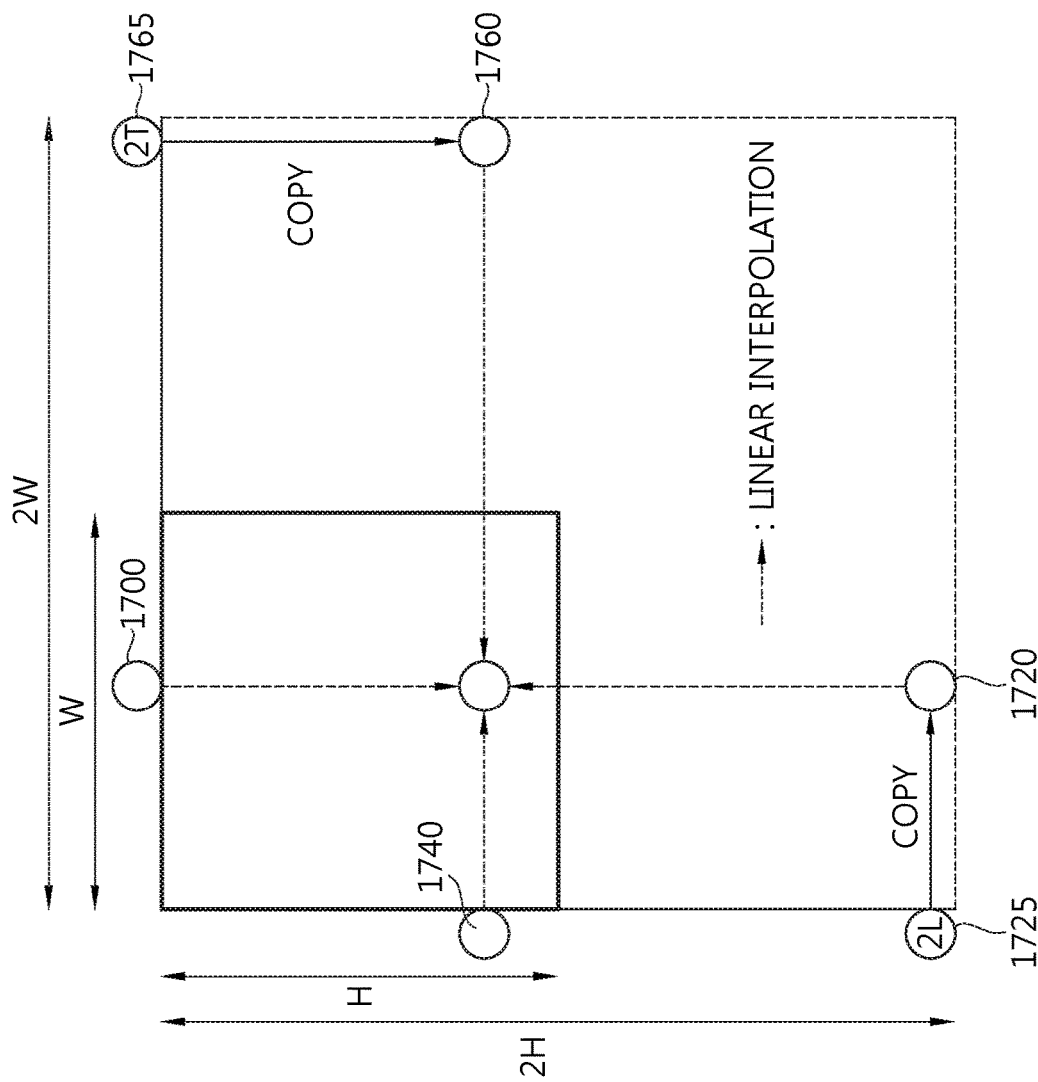
FIG. 17 is a conceptual diagram illustrating a prediction method using an advanced planar mode according to an embodiment of the invention.

FIG. 17 is a conceptual diagram illustrating an intra prediction method using an advanced planar mode according to an embodiment of the invention.

Referring to FIG. 17, four pixels can be used to generate the predicted value of each pixel included in a prediction unit.

The first pixel 1700 may be one pixel out of from the first top reference pixel to the n-th top reference pixel located above in the vertical direction of a prediction target pixel. The second pixel 1720 may be a pixel located below in the vertical direction of the prediction target pixel and may have a value obtained by copying the 2n-th left reference pixel 1725.

The third pixel 1740 may be one pixel out of from the first left reference pixel to the n-th left reference pixel located on the left side in the horizontal direction of the prediction target pixel. The fourth pixel 1760 may be a pixel located on the right side in the horizontal direction of the prediction target pixel and may have a value obtained by copying the 2n-th top reference pixel 1765.

In the planar prediction method according to an embodiment of the invention, the predicted values of the pixels included in the prediction unit can be generated using a method of performing bidirectional linear interpolation on the first pixel to the fourth pixel.

Figure 18:
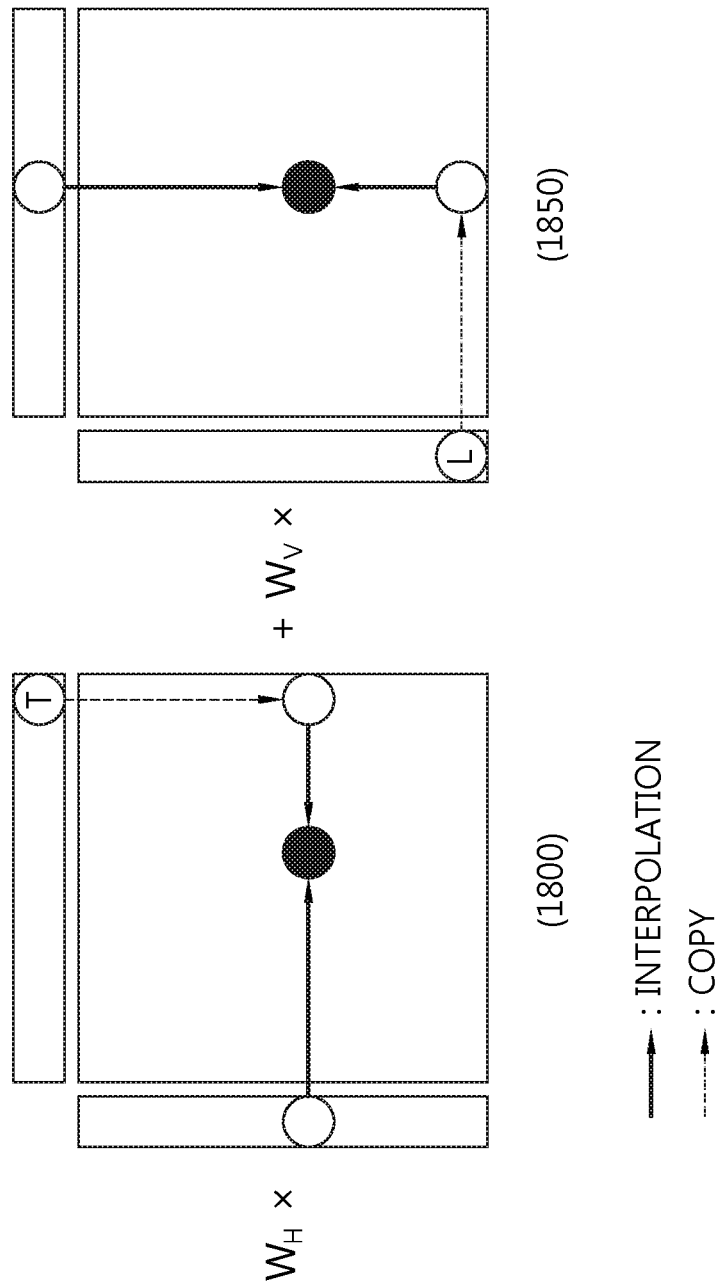
FIG. 18 is a conceptual diagram illustrating a prediction method using the planar mode according to an embodiment of the invention.

FIG. 18 is a conceptual diagram illustrating an intra prediction method using a planar mode according to an embodiment of the invention.

Referring to FIG. 18, weight values of a predetermined ratio may be given to the predicted value in the horizontal direction and the predicted value in the vertical direction to generate the predicted values of the prediction unit when performing prediction using a planar mode.

The predicted value in the horizontal direction can be derived by interpolating the value of the pixel located in the same row as the prediction target pixel out of the left reference pixels and the n-th top reference pixel (1800).

The predicted value in the vertical direction can be derived by interpolating the value of the pixel located in the same column as the prediction target pixel out of the top reference pixels and the n-th left reference pixel (1850).

The predicted value in the horizontal direction and the predicted value in the vertical direction can be generated by multiplying them by weight values.

Mathematical Expression 1 represents that a predicted value is generated on the basis of a weight value.

Mathematical Expression 1

$$P(x, y) = \frac{y+1}{x+y+2} \times Horz + \frac{x+1}{x+y+2} \times Vert$$

Referring to Mathematical Expression 1, a larger weight value is given to a closer direction depending on whether which direction is the closer direction among the horizontal direction and the vertical direction to generate the predicted value.

Figure 19:
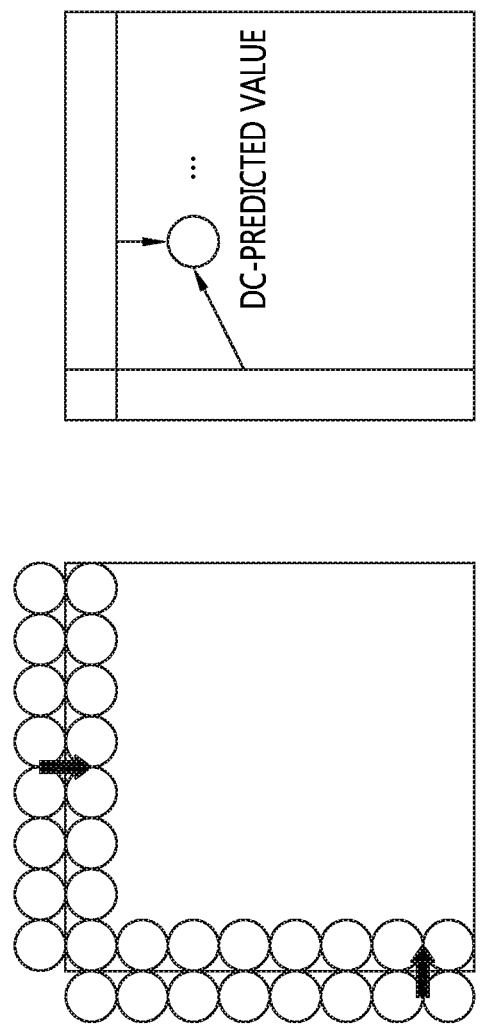
FIG. 19 is a conceptual diagram illustrating a prediction method using an advanced DC mode according to an embodiment of the invention.

FIG. 19 is a conceptual diagram illustrating an intra prediction method using an advanced DC mode according to an embodiment of the invention.

Referring to FIG. 19, when performing intra prediction using an advanced DC mode, the top reference pixels and the left reference pixels may be copied to the pixels of the first row and the first column of the prediction unit so as to minimize discontinuity from neighboring prediction units. The predicted value of the pixel located in the first row and the first column can be derived using the first pixel value of the top reference pixels or the first pixel value of the left reference pixels, the first pixel value of the top reference pixels or the first pixel value of the left reference pixels. The predicted values of the pixels other than the first row and the second column can be generated by performing the intra prediction using the DC mode on the basis of the predicted values of the first row and the first column of the prediction unit.

Figure 20:
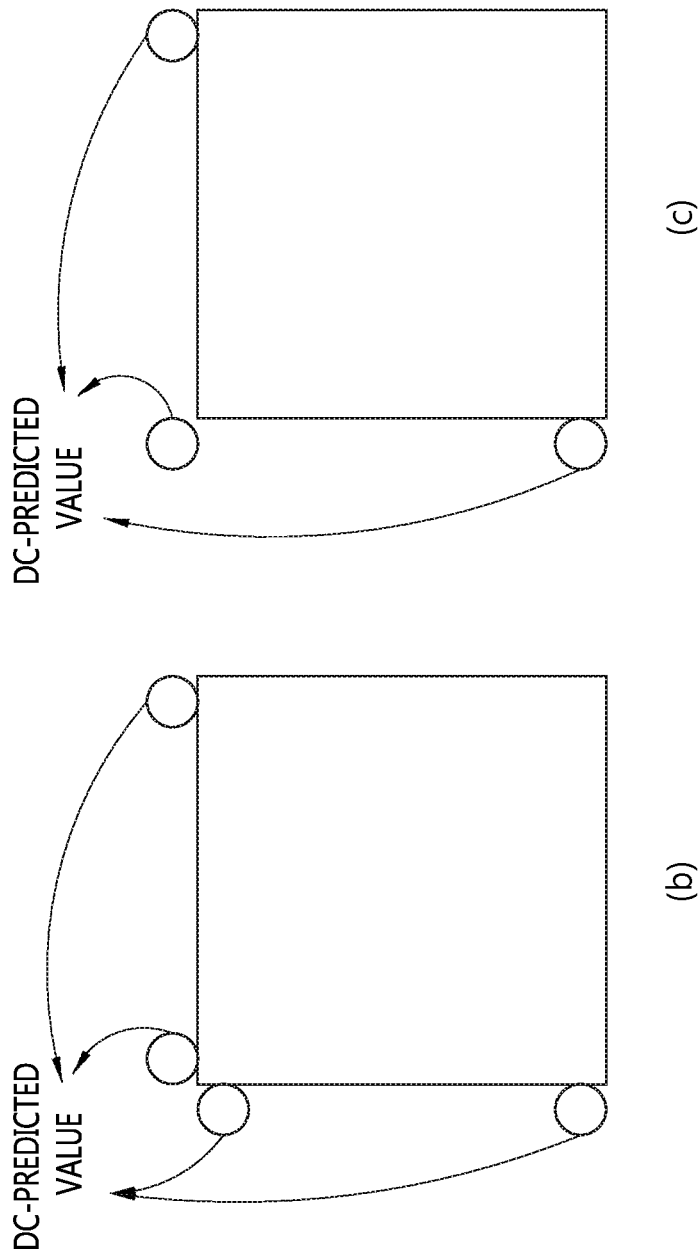
FIG. 20 is a conceptual diagram illustrating a prediction method using an advanced DC mode according to an embodiment of the invention.

FIG. 20 is a conceptual diagram illustrating an intra prediction method using an advanced DC mode according to an embodiment of the invention.

Referring to the left part of FIG. 20, in performing an intra prediction using an advanced DC mode, the predicted values can be generated by calculating the average value of the first top reference pixel which is the first pixel of the top reference pixels, the n-th top reference pixel which is the n-th pixel of the top reference pixels, the first left reference pixel which is the first pixel of the left reference pixels, and the n-th left reference pixel which is the n-th pixel of the left reference pixels. That is, it is possible to reduce calculation complexity when performing an intra prediction through the use of a method of deriving the predicted values of the pixels included in a prediction unit using only partial pixels of the reference pixels.

Referring to the right part of FIG. 20, in performing an intra prediction using an advanced DC mode, the predicted values can be generated by calculating the average value of the n-th top reference pixel which is the n-th pixel of the top reference pixels, the n-th left reference pixel which is the n-th pixel of the left reference pixels, and the top-left reference pixel. That is, similarly to the left part of FIG. 20, it is possible to reduce calculation complexity by using only partial pixels of the reference pixels.

FIG. 21 is a conceptual diagram illustrating an intra prediction method using an advanced DC mode according to an embodiment of the invention.

Referring to FIG. 21, in the intra prediction method using an advanced DC mode, the pixels of the first column and the first row are set to the DC-predicted values derived using the reference pixels (2100).

The DC-predicted values included in the first row and the first column may be the average values of the top reference pixels, the top-left reference pixel, and the left reference pixels.

A filtering operation is performed using the top reference pixels, the left reference pixels, and the top-left reference pixel (2120).

The pixels included in the first column and the first row other than the pixel located at the intersection of the first row and the first column in a prediction unit can be filtered using the reference pixels and a 2-tap filter. The pixel located at the intersection of the first row and the first column in the prediction unit can be filtered on the basis of the first top reference pixel and the first left reference pixel using a 3-tap filter.

The intra prediction using the DC mode is performed on the basis of the filtered pixels included in the first column and the first row to generate the predicted values of the pixels included in the prediction unit (2140). The intra prediction using the DC mode can be performed using the average value of the filtered pixels located in the first column and the first row.

FIG. 22 is a conceptual diagram illustrating an intra prediction method using an advanced DC mode according to an embodiment of the invention.

Referring to FIG. 22, the pixel values included in the first row and the first column of the prediction unit can be predicted by performing an intra prediction using a DC mode on the basis of the reference pixels (2200).

The intra-predicted values in the DC mode may be the average values of the top reference pixels, the top-left reference pixel, and the left reference pixels as shown in FIG. 21.

A filtering operation is performed using the top reference pixels, the left reference pixels, the top-left reference pixel, and the generated pixels included in the first row and the first column (2220).

The predicted pixels of the first column and the first row can be filtered using a 2-tap filter and the reference pixel values. The pixel located at the intersection of the first row and the first column can be filtered on the basis of the first top reference pixel and the first left reference pixel using a 3-tap filter.

The predicted values of the pixels included in the prediction unit other than the first row and the first column can be generated by calculating the average values of the pixel values located on the top and left sides (2240).

FIG. 23 is a conceptual diagram illustrating an intra prediction method using an advanced DC mode according to an embodiment of the invention.

Referring to FIG. 23, the top reference pixels and the left reference pixels are used as the predicted pixels of the prediction unit (2300). The top reference pixels and the left reference pixels can be used as the predicted values of the pixels included in the first column and the first row of the prediction unit.

The predicted values of the pixels of the first row and the first column may be derived on the basis of at least one of the first left reference pixels value and the first top reference pixel value.

As for the pixels in the remaining prediction unit other than the pixels included the first row and the first column, first predicted values can be derived by performing DC mode prediction on the basis of the pixel values of the first row and the first column (2320).

As for the predicted values in the prediction unit other than the pixel values included in the first row and the first column, second predicted values can be generated by calculating the average values of the pixel values located on the top and left sides (2340).

FIG. 24 is a conceptual diagram illustrating an intra prediction method using an advanced DC mode according to an embodiment of the invention.

Referring to FIG. 24, the predicted values in the DC mode are derived using the reference pixels.

The DC-predicted values can be derived by calculating the average values of the top reference pixels, the top-left reference pixel, and the left reference pixels.

Mathematical Expression 2 represents a method of deriving a predicted value using a DC mode.

$$DC_{pred} = \{P(-1,H-1) + \ldots + P(-1,0) + P(-1,-1) + P(0,-1) + \ldots + P(W-1,-1)\}/(W+H+1)$$

Mathematical Expression 2

A Deviation value between the predicted value using a DC mode for each reference pixel and the value of the corresponding reference pixel can be derived. Mathematical Expression 3 represents the value of the reference pixel and the predicted value using the DC mode.

$$D_V(x) = DC_{pred} - P(x,-1), x=0 \sim W-1$$

$$D_H(x) = DC_{pred} - P(-1,y), y=0 \sim H-1$$

Mathematical Expression 3

The predicted values of the pixels included in a prediction unit can be derived using the DC-predicted values derived by Mathematical Expression 2 and the average values of the x-direction deviations and the y-direction deviations derived by Mathematical Expression 3.

$$P(x,y) = DC_{pred} + (D_V(x) + D_H(y)) >> 1, x= 0 \sim W-1, y=0 \sim H-1$$

Mathematical Expression 4

By performing the intra prediction in this way and adding or subtracting the deviation values in the corresponding column and the corresponding row to or from the DC-predicted values, it is possible to reflect the characteristics of the rows and the columns.

Figure 25:
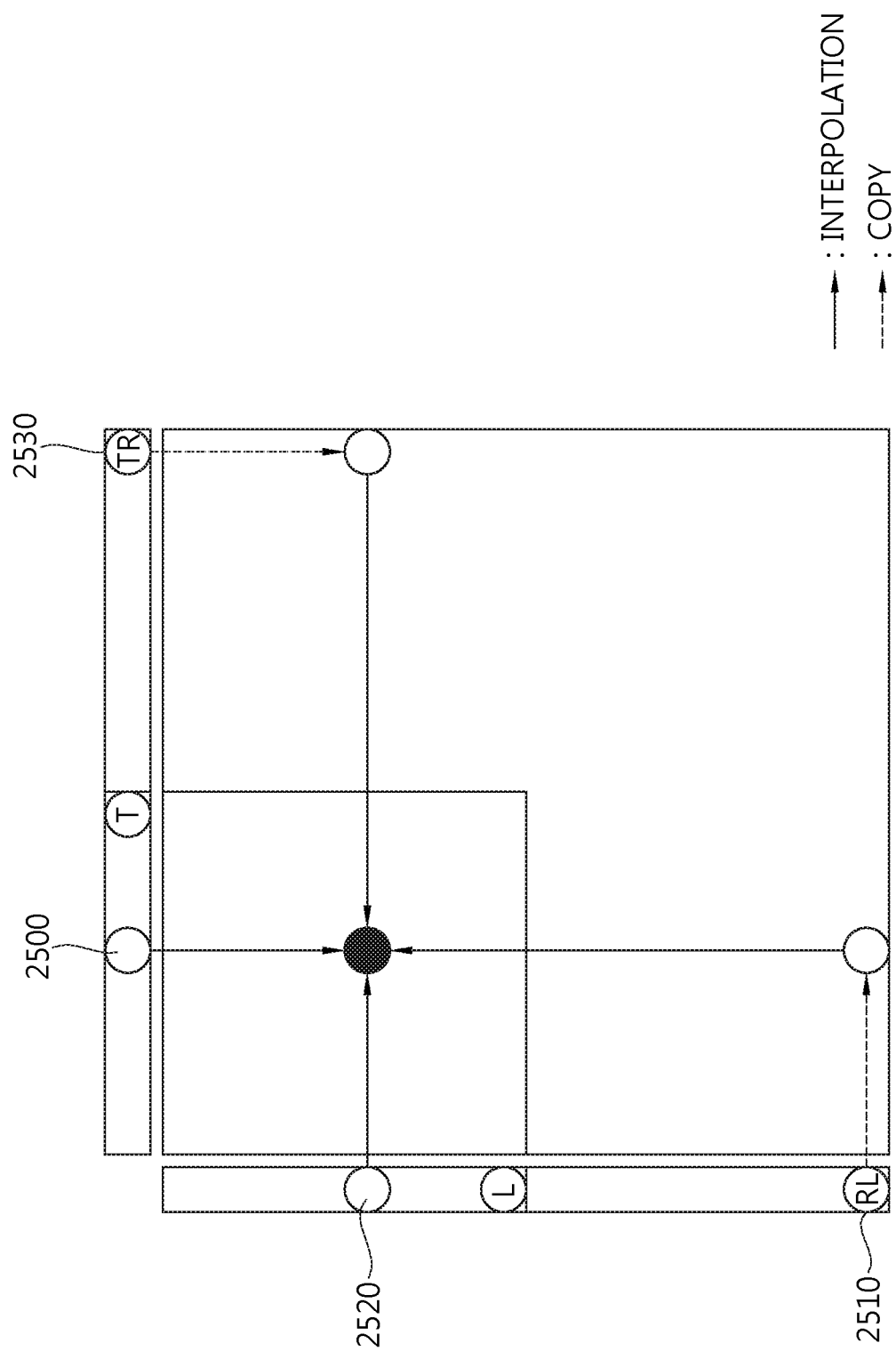
FIG. 25 is a conceptual diagram illustrating a prediction method using an advanced planar mode according to an embodiment of the invention.

FIG. 25 is a conceptual diagram illustrating an intra prediction method using an advanced planar mode according to an embodiment of the invention.

Referring to FIG. 25, in performing a planar prediction mode, vertical interpolation can be performed using the pixel 2500 located above in the vertical direction in the same column as the current prediction pixel and included in the top reference pixels and the 2n-th left reference pixel 2510 which is the 2n-th pixel of the left reference pixels. Horizontal interpolation can be performed using the left reference pixel value 2520 located on the left side in the horizontal direction of the current prediction pixel and included in the same row as the current prediction pixel and the 2n-th top reference pixel 2530 which is the 2n-th reference pixel of the top reference pixels.

When the 2n-th left reference pixel 2510 or the 2n-th top reference pixel 2530 is not present, the horizontal interpolation or the vertical interpolation can be performed using the n-th left reference pixel or the n-th top reference pixel.

Figure 26:
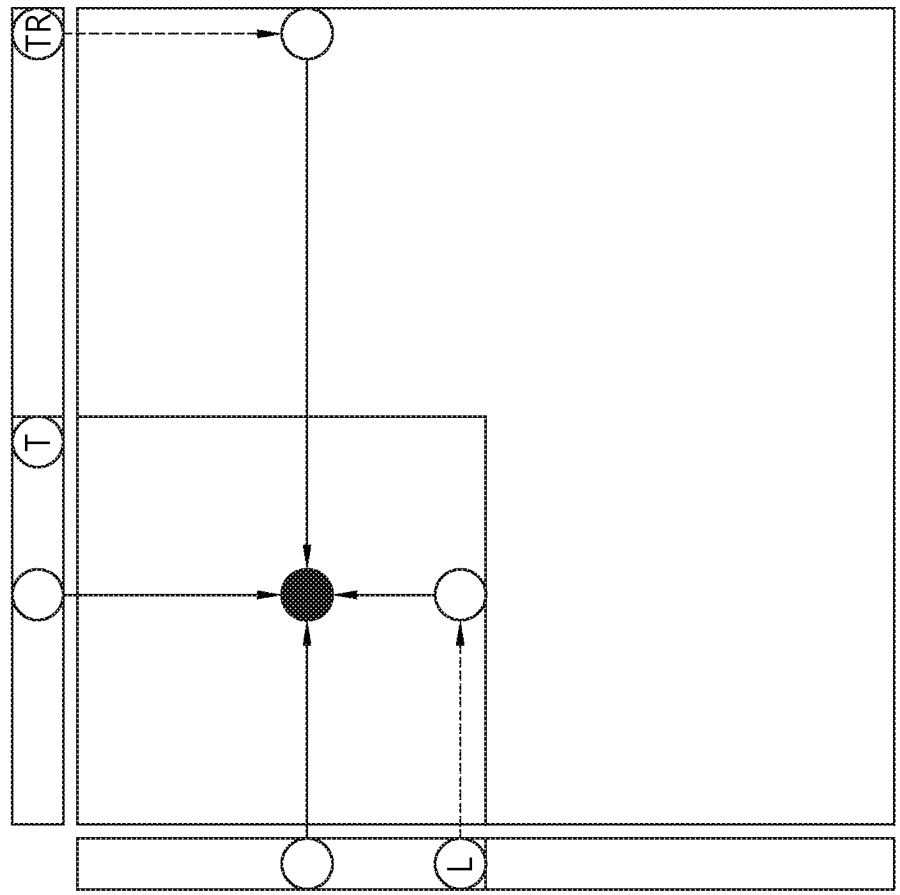
FIG. 26 is a conceptual diagram illustrating a method of performing a planar mode when the 2n-th left reference pixel or the 2n-th top reference pixel are not present in the embodiment of the invention.

FIG. 26 is a conceptual diagram illustrating a method of performing a planar mode prediction when the 2n-th left reference pixel or the 2n-th top reference pixel are not present according to an embodiment of the invention.

The left part of FIG. 26 shows a case where at least one of the 2n-left reference pixel and the 2n-th top reference pixel is not present.

When the 2n-th left reference pixel is not present, the interpolation can be performed using the n-th left reference pixel instead of the 2n-th left reference pixel. When the 2n-th top reference pixel is not present, the interpolation can be performed using the n-th top reference pixel instead of the 2n-th top reference pixel.

The right part of FIG. 26 shows a case where the 2n-th left reference pixel and the 2n-th top reference pixel are not present. When the 2n-th left reference pixel and the 2n-th top reference pixel are not present, the planar mode can be performed using the n-th left reference pixel and the n-th top reference pixel.

The image encoding method and the image decoding method described above can be embodied by the constituent modules of the image encoding device and the image decoding device described above with reference to FIGS. 1 and 2.

While the invention has been described with reference to the embodiments, it will be able to be understood by those skilled in the art that the invention can be modified and changed in various forms without departing from the spirit and scope of the invention described in appended claims.

The invention claimed is:

1. An image decoding method, comprising:
obtaining information on a prediction mode from a bitstream;
determining an intra prediction mode for a current block based on the information on the prediction mode;
deriving neighboring reference samples of the current block;
generating a prediction sample of the current block based on the intra prediction mode and 4 samples among the neighboring reference samples; and
generating a reconstructed sample based on the prediction sample,
wherein the 4 samples include a first sample located in a upper side of the current block and having a same x coordinate with the prediction sample, a second sample located in a right side of the first sample, a third sample located a left side of the current block and having a same y coordinate with the prediction sample, and a fourth sample located in a lower side of the third sample,
wherein the second sample is located in a right side of a right-most sample among neighboring samples adjacent to an upper boundary of the current block and has an x coordinate added a predetermined value into a greatest x coordinate in the current block, and wherein the fourth sample is located in a lower side of a lowest sample among neighboring samples adjacent to a left boundary of the current block and has an y coordinate added a predetermined value into a greatest y coordinate in the current block.

2. The method of claim 1, wherein the predetermined value is 1.

3. The method of claim 1, wherein the right-most sample among the neighboring reference samples adjacent to the upper boundary of the current block is located in a same column with a sample position adjacent to a left side of a right boundary of the current block, and wherein the lowest sample among the neighboring reference samples adjacent to the left boundary of the current block is located in a same row with a sample position adjacent to an upper side of a bottom boundary of the current block.

4. The method of claim 1, wherein when the current block is a block of N×N size (N is integer and N>0), wherein the second sample is located at among (N+1)-th through 2N-th, inclusive, sample positions with regard to an x-axis in the upper side of the current block, and the fourth sample is located at among (N+1)-th through 2N-th, inclusive, sample positions with regard to a y-axis in the left side of the current block, wherein the right-most sample among the neighboring samples adjacent to the upper boundary of the current block is located at N-th sample position with regard to x-axis, and wherein the lowest sample among the neighboring samples adjacent to the left boundary of the current block is located at N-th sample position with regard to y-axis.

5. The method of claim 4, wherein the second sample is located at the (N+1)-th sample position with regard to the x-axis in the upper side of the current block, and the fourth sample is located at the (N+1)-th sample position with regard to the y-axis in the left side of the current block.

6. The method of claim 1, wherein the prediction sample is derived based on the bi-directional interpolation according to a distance between the prediction sample and the first sample, a distance between the prediction sample and the second sample, a distance between the prediction sample and the third sample and a distance between the prediction sample and the fourth sample.

7. The method of claim 6, wherein weight is applied to each of the values of the 4 samples which is used for the bi-directional interpolation.

8. The method of claim 1, wherein the prediction sample is derived based on the bi-directional interpolation according to a vertical distance between the prediction sample and the first sample, a vertical distance between the prediction sample and the fourth sample, a horizontal distance between the prediction sample and the second sample, and a horizontal distance between the prediction sample and the third sample.

9. An image encoding method, comprising:
determining an intra prediction mode for a current block;
generating information on a prediction mode based on the determined intra prediction mode;
deriving neighboring reference samples of the current block;
generating a prediction sample in the current block based on the intra prediction mode and 4 samples among the neighboring reference samples;

deriving a residual sample in the current block based on the prediction sample; and generating a bitstream by encoding image information including the information on the prediction mode and information on the residual sample, wherein the 4 samples include a first sample located in a upper side of the current block and having a same x coordinate with the prediction sample, a second sample located in a right side of the first sample, a third sample located a left side of the current block and having a same y coordinate with the prediction sample, and a fourth sample located in a lower side of the third sample, wherein the second sample is located in a right side of a right-most sample among neighboring samples adjacent to an upper boundary of the current block and has an x coordinate added a predetermined value into a greatest x coordinate in the current block, and wherein the fourth sample is located in a lower side of a lowest sample among neighboring samples adjacent to a left boundary of the current block and has an y coordinate added a predetermined value into a greatest y coordinate in the current block.

10. The method of claim 9, wherein the predetermined value is 1.

11. The method of claim 9, wherein the right-most sample among the neighboring reference samples adjacent to the upper boundary of the current block is located in a same column with a sample position adjacent to a left side of a right boundary of the current block, and wherein the lowest sample among the neighboring reference samples adjacent to the left boundary of the current block is located in a same row with a sample position adjacent to an upper side of a bottom boundary of the current block.

12. The method of claim 9, wherein when the current block is a block of N×N size (N is integer and N>0), wherein the second sample is located at among (N+1)-th through 2N-th, inclusive, sample positions with regard to an x-axis in the upper side of the current block, and the fourth sample is located at among (N+1)-th through 2N-th, inclusive, sample positions with regard to a y-axis in the left side of the current block, wherein the right-most sample among the neighboring reference samples adjacent to the upper boundary of the current block is located at N-th sample position with regard to x-axis, and wherein the lowest sample among the neighboring reference samples adjacent to the left boundary of the current block is located at N-th sample position with regard to y-axis.

13. The method of claim 12, wherein the second sample is located at the (N+1)-th sample position with regard to the x-axis in the upper side of the current block, and the fourth sample is located at the (N+1)-th sample position with regard to the y-axis in the left side of the current block.

14. The method of claim 9, wherein the prediction sample is derived based on the bi-directional interpolation according to a distance between the prediction sample and the first sample, a distance between the prediction sample and the second sample, a distance between the prediction sample and the third sample and a distance between the prediction sample and the fourth sample.

15. The method of claim 9, wherein the prediction sample is derived based on the bi-directional interpolation according to a vertical distance between the prediction sample and the first sample, a vertical distance between the prediction sample and the fourth sample, a horizontal distance between the prediction sample and the second sample, and a horizontal distance between the prediction sample and the third sample.

16. A non-transitory decoder-readable storage medium storing a bitstream generated by performing the steps of: determining an intra prediction mode for a current block; generating information on a prediction mode based on the determined intra prediction mode; deriving neighboring reference samples of the current block; generating a prediction sample in the current block based on the intra prediction mode and 4 samples among the neighboring reference samples; deriving a residual sample in the current block based on the prediction sample; and generating a bitstream by encoding image information including the information on the prediction mode and information on the residual sample, wherein the 4 samples include a first sample located in a upper side of the current block and having a same x coordinate with the prediction sample, a second sample located in a right side of the first sample, a third sample located a left side of the current block and having a same y coordinate with the prediction sample, and a fourth sample located in a lower side of the third sample, wherein the second sample is located in a right side of a right-most sample among neighboring samples adjacent to an upper boundary of the current block and has an x coordinate added a predetermined value into a greatest x coordinate in the current block, and wherein the fourth sample is located in a lower side of a lowest sample among neighboring samples adjacent to a left boundary of the current block and has an y coordinate added a predetermined value into a greatest y coordinate in the current block.

\* \* \* \* \*